United States Patent
Cooper et al.

(10) Patent No.: US 11,356,413 B2
(45) Date of Patent: *Jun. 7, 2022

(54) PROVIDING A FAST PATH BETWEEN TWO ENTITIES

(71) Applicant: McAfee, LLC, San Jose, CA (US)

(72) Inventors: Geoffrey Howard Cooper, Palo Alto, CA (US); John Richard Guzik, Sunnyvale, CA (US)

(73) Assignee: McAfee, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/797,360

(22) Filed: Feb. 21, 2020

(65) Prior Publication Data

US 2020/0195610 A1 Jun. 18, 2020

Related U.S. Application Data

(63) Continuation of application No. 14/911,576, filed as application No. PCT/US2013/074195 on Dec. 10, 2013, now Pat. No. 10,587,576.

(Continued)

(51) Int. Cl.
*H04L 12/64* (2006.01)
*H04L 49/00* (2022.01)
*H04L 9/40* (2022.01)

(52) U.S. Cl.
CPC ...... *H04L 63/0236* (2013.01); *H04L 12/6418* (2013.01); *H04L 49/3009* (2013.01);
(Continued)

(58) Field of Classification Search
USPC .......................................................... 726/1
See application file for complete search history.

(56) References Cited

U.S. PATENT DOCUMENTS 5,778,174 A * 7/1998 Cain ................... H04L 63/0209
726/11
5,987,610 A * 11/1999 Franczek ............. G06F 21/564
726/24

(Continued)

FOREIGN PATENT DOCUMENTS

| EP | 1368718 B1 | 9/2008 |
| WO | 2013081620 A1 | 6/2013 |
| WO | 2015041706 A1 | 3/2015 |

OTHER PUBLICATIONS

CN Oct. 22, 2018 Second Office Action from counterpart Chinese Application No. 201380079059.8; 6 pgs. [Includes English translation].

(Continued)

*Primary Examiner* — Badri Narayanan Champakesan
(74) *Attorney, Agent, or Firm* — Patent Capital Group

(57) ABSTRACT

The present disclosure combines Software Defined Networks (SDN) concepts with Security concepts. The coordination between SDN and Security provides a myriad of advantageous use cases. One exemplary use case involves providing a fast path at network speeds using SDN by routing network traffic to bypass a security appliance once the security appliance determines that the security appliance no longer needs to inspect the network traffic. Another exemplary use case involves remote provisioning of security zones.

17 Claims, 12 Drawing Sheets

Related U.S. Application Data

(60) Provisional application No. 61/881,357, filed on Sep. 23, 2013.

(52) U.S. Cl.
CPC .......... *H04L 49/70* (2013.01); *H04L 63/0209* (2013.01); *H04L 63/102* (2013.01); *H04L 63/20* (2013.01)

(56) References Cited

U.S. PATENT DOCUMENTS

| | | | | |
|---|---|---|---|---|
| 6,073,142 | A * | 6/2000 | Geiger | G06Q 10/107 709/204 |
| 6,460,050 | B1 * | 10/2002 | Pace | G06Q 10/107 |
| 7,188,250 | B1 * | 3/2007 | Altieri | H04L 9/06 713/161 |
| 7,506,155 | B1 * | 3/2009 | Stewart | G06F 21/56 713/152 |
| 8,316,435 | B1 * | 11/2012 | Varadhan | H04L 63/0254 726/15 |
| 8,339,959 | B1 * | 12/2012 | Moisand | H04L 63/1408 370/235 |
| 8,438,631 | B1 * | 5/2013 | Taylor | G06F 21/6236 726/15 |
| 8,689,316 | B2 * | 4/2014 | Mao | H04L 63/02 726/13 |
| 9,584,479 | B2 * | 2/2017 | Keohane | H04L 49/70 |
| 2001/0037387 | A1 * | 11/2001 | Gilde | H04L 47/20 709/225 |
| 2004/0114589 | A1 * | 6/2004 | Alfieri | H04L 63/0428 370/389 |
| 2008/0062991 | A1 * | 3/2008 | Kumar | H04L 49/90 370/392 |
| 2009/0157866 | A1 * | 6/2009 | Sridharan | H04L 69/16 709/224 |
| 2009/0158430 | A1 * | 6/2009 | Borders | H04L 63/1408 726/23 |
| 2010/0154057 | A1 * | 6/2010 | Ko | H04L 65/1006 726/23 |
| 2013/0039189 | A1 * | 2/2013 | Sugiyama | H04L 61/2061 370/241 |
| 2013/0212644 | A1 * | 8/2013 | Hughes | H04L 61/6022 726/3 |
| 2013/0223442 | A1 * | 8/2013 | Narayanan | H04L 49/25 370/389 |
| 2013/0347110 | A1 * | 12/2013 | Dalal | H04L 41/12 726/23 |
| 2014/0010083 | A1 * | 1/2014 | Hamdi | H04L 47/10 370/235 |
| 2014/0033275 | A1 * | 1/2014 | Kawamoto | H04L 63/102 726/3 |
| 2014/0115578 | A1 * | 4/2014 | Cooper | G06F 21/606 718/1 |
| 2014/0157397 | A1 * | 6/2014 | Dalal | G06F 13/1673 726/13 |
| 2014/0215560 | A1 * | 7/2014 | Roberson | H04L 67/142 726/3 |
| 2014/0247753 | A1 * | 9/2014 | Koponen | H04L 43/0823 370/255 |
| 2014/0269299 | A1 * | 9/2014 | Koornstra | H04L 63/1416 370/235 |
| 2014/0269716 | A1 * | 9/2014 | Pruss | H04L 45/74 370/392 |
| 2014/0298021 | A1 * | 10/2014 | Kwon | H04L 1/1809 713/168 |
| 2014/0359700 | A1 * | 12/2014 | Krieger | H04L 63/166 726/3 |
| 2015/0026794 | A1 * | 1/2015 | Zuk | H04L 69/22 726/13 |
| 2015/0222446 | A1 * | 8/2015 | Suresh | H04L 12/185 370/390 |
| 2016/0205071 | A1 | 7/2016 | Cooper et al. | |

OTHER PUBLICATIONS

CN May 2, 2018 First Office Action from counterpart Chinese Application No. 201380079059.8; 16 pgs.
CN Feb. 19, 2019 Notice on Grant of Patent Right from counterpart Chinese Application No. CN201380079059.8; 4 pages.
International Search Report and Written Opinion in International Application No. PCT/US2013/074195 dated Jun. 20, 2014, 9 pages.
USPTO Aug. 3, 2017—Non-Final Rejection from U.S. Appl. No. 14/911,576; 34 pages.
USPTO Dec. 14, 2017—Final Rejection from U.S. Appl. No. 14/911,576; 31 pages.
USPTO Feb. 21, 2019—Non-Final Rejection from U.S. Appl. No. 14/911,576; 36 pages.
USPTO Jun. 20, 2019—Final Rejection from U.S. Appl. No. 14/911,576; 24 pages.

* cited by examiner

FROM FIG. 5A

Traffic Browser => Firewall 291.513424  10.79.1.1 -> 10.79.11.10  TCP 78 58352 > 80 [SYN] Seq=0 Win=14600 Len=0 MSS = 1460 SACK_PERM=1 TSval=129237279 TSecr=0 WS=128
291.514052  10.79.1.1 -> 10.79.11.10  TCP 78 58352 > 80 [SYN] Seq=0 Win=14600 Len=0 MSS = 1460 SACK_PERM=1 TSval=129237279 TSecr=0 WS=128
291.514574  10.79.11.10 -> 10.79.1.1  TCP 78 80 > 58352 [SYN, ACK] Seq=0 Ack=1 Win=14480 Len=0 MS S=1460 SACK_PERM=1 TSval=516859305 TSecr=129237279 WS=32
291.514652  10.79.1.1 -> 10.79.11.10 TCP 70 58352 > 80 [ACK] Seq=1 Ack=1 Win=14720 Len=0 TSval=1 29237280 TSecr=516859305
291.514852  10.79.1.1 -> 10.79.11.10 TCP 70 [TCP Dup ACK 28#1] 58352 > 80 [ACK] Seq=1 Ack=1 Win= 14720 Len=0 TSval=129237280 TSecr=516859305
291.595449 10.79.1.1 -> 10.79.11.10 HTTP 371 GET /favicon.ico HTTP/1.1
291.597930 10.79.1.1 -> 10.79.11.10 HTTP 371 [TCP Retransmission] GET /favicon.ico HTTP/1.1
291.598048 10.79.11.10 -> 10.79.1.1 TCP 70 80 -> 58352 [ACK] Seq=1 Ack=302 Win=15552 Len=0 TSval =516859389 TSecr=129237300
291.598321 10.79.11.10 -> 10.79.1.1 TCP 70 [TCP Dup ACK 32#1] 80 > 58352 [ACK] Seq=1 Ack=302 Win= 15552 Len=0 TSval=516859389 TSecr=129237300

540
TRAFFIC MONITOR

PACKET DUMP AT FIREWALL SHOWS CONNECTION "STOPS" AFTER FASTPATH. SWITCH BYPASSES FW

FIG. 5B

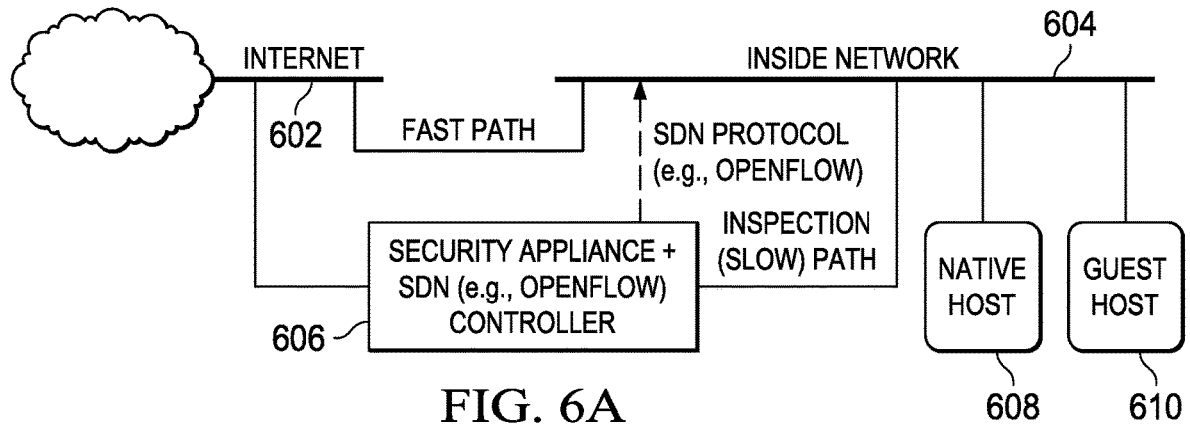
FIG. 6A
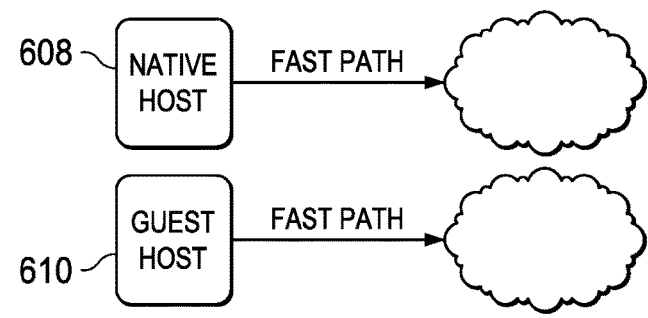
FIG. 6B
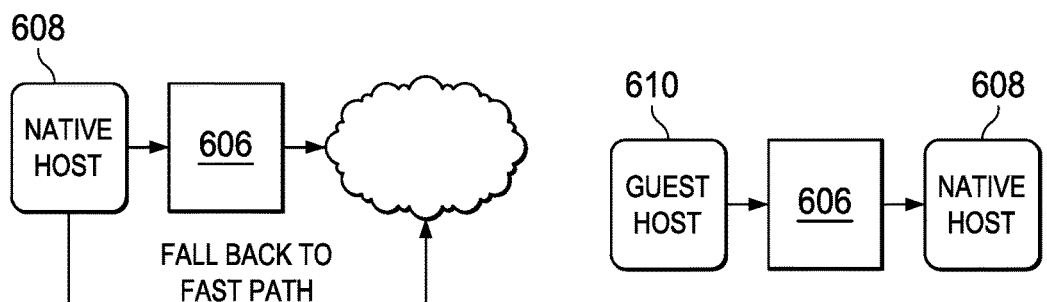
FIG. 6C
FIG. 6D

PROVIDING A FAST PATH BETWEEN TWO ENTITIES

PRIORITY DATA

This Applications is a continuation application of U.S. application Ser. No. 14/911,576 filed on Feb. 11, 2016 and entitled "PROVIDING A FAST PATH BETWEEN TWO ENTITIES," which is a National Stage application under 35 U.S.C. 371 of International Application PCT/US13/74195 filed on Dec. 10, 2013 and entitled "PROVIDING A FAST PATH BETWEEN TWO ENTITIES," which claims priority to U.S. Provisional Patent Application Ser. No. 61/881,357, filed on Sep. 23, 2013 and entitled "SYSTEM AND METHOD FOR PROVIDING A FAST PATH BETWEEN TWO ENTITIES." The disclosures of the prior applications are considered part of and are incorporated by reference in the disclosure of this application.

TECHNICAL FIELD

Embodiments described herein generally relate to the field of computing and, more specifically, providing a fast path between two entities using a software defined network (SDN) controller and/or security zones in a SDN environment.

BACKGROUND

Software Defined Networks (SDN) is a mechanism for separating the control plane and data planes in the network. The data plane lives in the switching fabric, as before. The control plane is a program that runs on a standard operating system, written in a standard programming language. A standard protocol (e.g., OpenFlow, or any suitable SDN protocol) connects the two together. SDN is interesting for several reasons. Creation of logical boundaries is purely in the control plane. Virtualization platforms can create a topology (entirely) in software, simplifying virtual applications and virtual machine "motion", and network appliances become dependent on SDN, since the location of the appliance must be provisioned in the SDN control plane. Application-specific or non-local factors can be considered in switching decisions. SDN control plane enables maintaining global state information or information specific to an application, e.g., global link state and quality of service, providing cable TV+internet on the same fabric. Moreover, L3 routing can be done more efficiently using L2+SDN.

OpenFlow is one of many communications protocols or other computer interface mechanisms that gives access to the forwarding plane of a network switch or router over the network through the concept of SDN. The Open Networking Foundation (ONF), a user-led organization dedicated to promotion and adoption of software-defined networking (SDN), manages the OpenFlow standard. ONF defines OpenFlow as the first standard communications interface defined between the control and forwarding layers of an SDN architecture. OpenFlow allows direct access to and manipulation of the forwarding plane of network devices such as switches and routers, both physical and virtual (hypervisor-based). A protocol like OpenFlow is needed to move network control out of proprietary network switches and into control hardware and software that is open source and locally managed. Other SDN protocols may include: Frenetic programming language, VMWare vSphere Client, TRI, etc.

OpenFlow or other suitable SDN protocols allows the path of network packets through the network of switches to be determined by software running on multiple routers (e.g., "OpenFlow switches"). An OpenFlow controller (or generally, a SDN controller) may be provided to manage the OpenFlow switches running on the routers (or some other appropriate network element). This separation of the control from the forwarding allows for more sophisticated traffic management than is feasible using access control lists (ACLs) and routing protocols.

A number of network switch and router vendors have announced intent to support or are shipping supported switches for OpenFlow. Some network control plane implementations use the protocol to manage the network forwarding elements. OpenFlow may be used between the switch and controller on a secure channel such as Transport Layer Security (TLS).

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 5A-B show an annotated screen shot showing the results of bypassing a firewall (FW) using SDN, according to some embodiments of the disclosure;

FIGS. 6A-D are simplified block diagrams illustrating different exemplary implementations of security policies using SDN, according to some embodiments of the disclosure;

DETAILED DESCRIPTION OF EMBODIMENTS

Software Defined Networks (SDN) involve having switch hardware that provides data plane (flows), and uses, e.g., OpenFlow protocol or any suitable protocol, to define control plane (i.e., topology and routing). Generally, a SDN comprises one or more controllers which interfaces between the physical or virtual switches and SDN applications (virtualization layer), and an SDN protocol such as OpenFlow allows for communication between the switches and the controllers.

The present disclosure combines Software Defined Networks (SDN) concepts with Security concepts. The coordination between SDN and Security provides a myriad of advantageous use cases. One exemplary use case involves providing a fast path at network speeds using SDN by routing network traffic to bypass a security appliance once the security appliance determines that the security appliance no longer needs to inspect the network traffic. Another exemplary use case involves remote provisioning of security zones.

Figure 1:
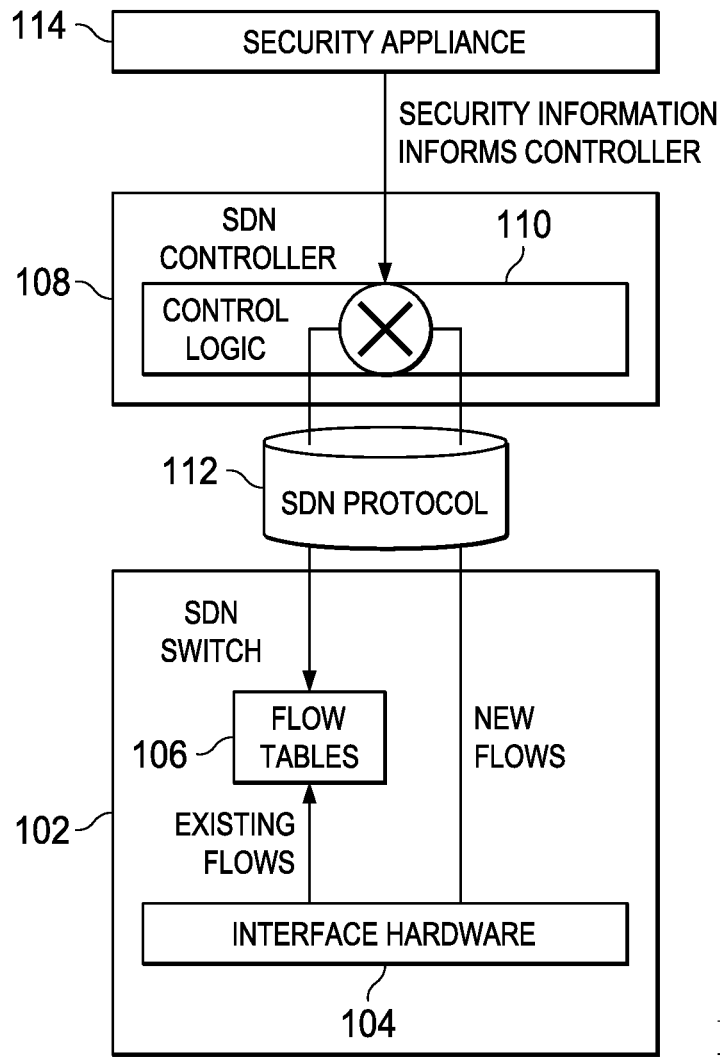
FIG. 1 is a simplified block diagram of an example security appliance, an example SDN controller, and an SDN switch, in accordance with an embodiment of the disclosure.

FIG. 1 is a simplified block diagram of an exemplary security appliance, an exemplary SDN controller, and an exemplary SDN switch, for use in a SDN environment, in accordance with an embodiment of the disclosure. Generally, SDN switch 102 (or an SDN switching module executable by a processor) uses interface hardware 104 for routing existing data flows using flow tables 106. The term "data flow" as used herein describes network traffic, i.e., packets, transmitted between two points of a network, e.g., a source to a destination, a server to a client, a client to a server, etc. The term "data flow" may be used interchangeably with "data connection" or "flow" (commonly used in network switching terminology). Examples of "data flows" include Internet Protocol (IP) flows, User Datagram Protocol (UDP) flows, Internet Control Message Protocol (ICMP), and Transport Control Protocol (TCP) flows. Flows may correspond to packets being transported according to the Ethernet protocol (e.g., 802.11), IPV6, or any other protocols within any of the layers of the Open Systems Interconnection (OSI) model, including (1) physical layer, (2) data link layer, (3) network layer, (4) transport layer, (5) session layer, (6) presentation layer, and (7) application layer, are also envisioned. For example, a data flow may include a HTTP/1.1 connection that includes multiple transactions is a single flow, an IPSec tunnel between two locations is a single flow, a set of DNS transactions between a single client and a single server may form one or more flows, depending on the timing of the transactions, DNS transactions between multiple clients and servers form many flows. Generally speaking, a flow is a set of packets in motion all of which match an N-tuple of packet parameters, which can be identified and processed according to the parameters within a corresponding layer or layers in the OSI model. Flow may go in both directions, i.e., from point A to point B and from point B to point A. The switching/routing for the flows (i.e., paths the flows traverses in the network) in both directions could be asymmetric, i.e., do not necessary traverse the same path in both directions. Because SDN can be applied at all the layers of the OSI model, the terms "switching" and "routing" (or other terms related to these) are used interchangeably to refer to the mechanism in which packets are transported through network elements in a network.

For routing new data flows, SDN switch 102 passes on information to SDN controller 108 to determine how the new flow should be routed. SDN switch 102 and SDN controller 108 communicate using a suitable SDN protocol, e.g., OpenFlow Protocol, which provides an interface between SDN controller 108 and (physical) SDN switches such as SDN switch 102.

The SDN controller 108 then provides control logic 110 which configures one or more SDN switches in the SDN environment to route the new data flow appropriately. For instance, control logic 110 applies a suitable routing/switching algorithm which determines entries for, e.g., flow table 106, in order for one or more SDN switches in the SDN environment to route the new data flow appropriately (e.g., according to a shortest/optimal path routing algorithm). In other words, control logic 110 controls the routing of network traffic or data flows in the SDN environment using one or more SDN switches in the SDN environment. For instance, the algorithm applied by the control logic 110 may include a Best Path routing algorithm selected by external software, such as Quagga. Control logic 110 updates flow tables 106, e.g., by providing one or more entries for flow tables 106. In some embodiments, control logic 110 comprises logic for determining one or more flow table entries for configuring flow table(s) of the one or more SDN switches, such as flow table(s) 106 of SDN switch 102.

Within the context of the disclosure, switching and routing are used herein interchangeably as a term which refers to moving of packets from one point of a network to another point of the network. The decisions on how to move the packets (e.g., flow tables for deciding how to forward a packet) may operate at any layers of the OSI model. An SDN controller may have control logic which has a routing or a switching algorithm for generating flow entries for any layers of the OSI model. Accordingly, SDN concepts of the present disclosure can control switching or routing of these packets by updating the flow tables of the network routing/switching elements at any of the layers of the OSI model. Any specific examples related to a particular layer of the OSI model serves to illustrate the combination of SDN concepts with security models, and does not serve to limit the present disclosure to those specific examples.

Effectively, SDN controller 108 (i.e., the control plane) is virtualized and abstracted from the (physical) SDN switch (i.e., the data plane). Leveraging this abstraction, SDN controller 108 can provide/reconfigure control logic 110 according to external information (beyond routing algorithms, load balancing algorithms, etc.). The external information may include one or more security policies from security appliance 114. To this effect, security appliance 114 may transmit one or more security policies to SDN controller 108, and SDN controller 108 reconfigures control logic 110 according to the one or more security policies received. As a result, the control logic 110, once reconfigured by SDN controller 108, changes the routing in the SDN environment according to the one or more security policies. Specifically, the control logic 110 updates flow tables such as flow tables 106 to ensure the SDN environment is compliant with the one or more security policies. This provides a way to implement security policies on the fly by reconfiguring the SDN switches, and in some cases, allowing security policies to be applied in a remote manner.

Coupling a security appliance and a SDN controller can implement a security model in a network. Generally speaking, a security model specifies and enforces one or more security policies. Security policies may relate to one or more different aspects of providing a security model for a network. One or more security policies may specify one or more of the following: security zone(s), adding/removal of security zones, membership to security zones, network access right(s), data access right(s), insertion of a security appliance in a path between two cooperating entities, and removal of a security appliance from a path between two cooperating entities. One example aspect includes a policy which requires a particular data flow to be inspected by a security appliance (for both directions or for just one direction of network traffic between two cooperating entities). Another example aspect includes a policy which specifies that a particular data flow does not need to be inspected by a security appliance (for both or just one direction of network traffic between two cooperating entities). Another example aspect includes defining one or more security zones, where different security zones may have different network or data access rights. Another example aspect includes defining one or more security zones for purposes of isolating network or data between security zones. Another example aspect includes a policy which requires data flows from one security zone to another security zone (in both or one direction of network traffic) to be inspected by a security appliance. Another example aspect includes a policy which specifies that data flows from one security zone to another security zone do not need to be inspected by a security appliance.

Various security appliances may be used with SDN. In particular, security appliances which can enforce one or more security policies via routing can be used with SDN to implement the security policies in the SDN environment. Generally speaking, a security appliance scans or inspects packet headers and/or payload within one or more layers of the OSI model. For instance, a security appliance may filter or process packets based on characteristics of packets according to the security model. A security appliance may be implemented on or provided in a physical security device, and the term "security appliance" may be used interchangeably with "security device" herein. Security appliances may include one or more of the following, but these examples are not limited to:

a firewall which performs deep packet inspection of network traffic which traverses through the firewall;
an intrusion prevention system for monitoring and identifying malicious network traffic in the SDN environment;
a data loss prevention system for detecting potential data breach by monitoring, detecting, and blocking sensitive data traversing through the SDN environment;
a web security appliance or proxy for filtering data between a client and a server (or cooperating entities);
a data loss prevention appliance that scans for potential data breach;
an email gateway that filters email for security and removes SPAM (unwanted email);
a security analysis device, that performs static or dynamic analysis on files transmitted within network traffic;
an identity appliance that scans traffic to glean the identities of users on the network;
an application firewall that dynamically learns application usage and thereby creates and enforces a security policy;
a network monitoring device that monitors traffic and presents a status display to system administrators;
a traffic shaping appliance that affects flow performance according to a security policy; and
an encrypting gateway that selectively encrypts or decrypts specific network flows.

Figure 2:
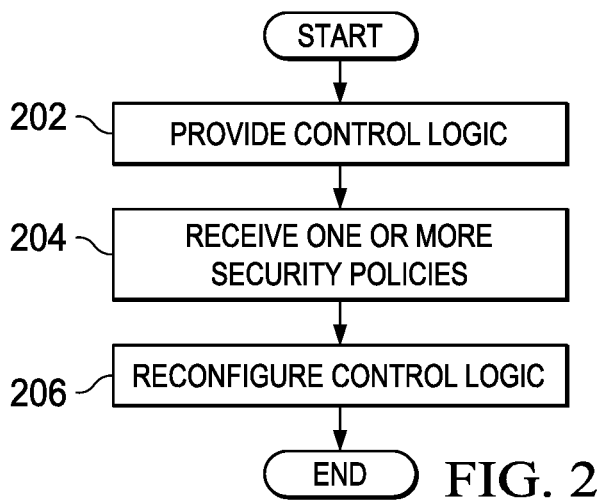
FIG. 2 is a simplified flowchart illustrating potential activities associated with some embodiments of the disclosure.

FIG. 2 is a simplified flowchart illustrating potential activities associated with some embodiments of the disclosure, such as the one shown in FIG. 1. In at least one embodiment, there is a set of operations that corresponds to the activities of FIG. 2. An apparatus, for example SDN controller 108 of FIG. 1, or a portion thereof, may utilize the set of operations. The apparatus may comprise means, including, for example processor 1200 of FIG. 12, for performing such operations encoded in memory, e.g., memory 1270. In an embodiment, an apparatus, for example computing system 1300 of FIG. 13, is transformed by having memory, e.g., memory 1332 and memory 1334, comprising computer code configured to, working with a processor, for example processing element 1370 and processing element 1380, cause the apparatus to perform set of operations of FIG. 2 (or any operations disclosed herein).

At block 202, the apparatus, e.g., a SDN controller, provides control logic for configuring the SDN environment. For instance, SDN controller 108 of FIG. 1 provides control logic 110. Routing of network traffic using one or more SDN switches in the SDN environment is controlled by the control logic. In some embodiments, the control logic comprises one or more routing algorithms configured to implement a particular network topology (e.g., according to a particular routing protocol, and/or to enforce one or more security zones). In some embodiments, the control logic comprises one or more routing algorithms configured to enforce a particular route, e.g., for a particular data flow or data connection, between two nodes in the SDN environment (or generally speaking, two cooperating entities). The one or more routing algorithms preferably provide entries to the flow tables in the SDN switches to enable the SDN switches to route network traffic appropriately.

At block 204, the apparatus (e.g., a receiver of SDN controller 108) receives one or more security policies for the SDN environment from a security appliance at the SDN controller. One or more security policies may include one or more network security policies which can be carried out or enforced through routing. In one instance, a security policy may specify that a security appliance be inserted into a path traversed by a particular data flow/connection. In another instance, a security policy may specify that a particular network node belongs to one among one or more security zones to enforce a particular levels of security, e.g., with regards to network and/or data access.

At block 206, in response to receiving the one or more security policies, the apparatus, e.g., the SDN controller, reconfigures the control logic for controlling the SDN environment according to the one or more security policies received from the security appliance. For instance, the control logic may take the one or more security policies as input, and determines one or more entries for flow tables, such as flow tables 106 of SDN switch 102, to enforce the one or more security policies through routing.

Variations to the flow illustrated in FIG. 2 are described in relation to the following figures.

Combining Security Appliance Functions with SDN

By combining the security appliance functions (e.g., firewall functions) with the SDN functions, the system provides several advantages. For instance, a security appliance, e.g., a firewall, is aware of topology "hidden" in the control plane (e.g., virtualized topology), and the SDN controller can perform some simple firewall functions, e.g., the firewall is used only for deep scanning, while firewalling based only on IP address and/or TCP or UDP port numbers (sometimes called 'basic firewalling') can run at switch speeds. This permits the firewall to appear to forward packets at switching speeds, e.g., the "UDP packet rate" metric for the firewall is now at switching speeds. The system can also provide a "Super Fast Path" for long connections, where the firewall works cooperatively with SDN switching to start the connection in the firewall, finish it in the switch, thus bypassing the firewall for part of the connection. In another instance, the system supports Dynamic Zoning, e.g., where a firewall can use information obtained from endpoint security systems or network admittance criteria to place some devices (e.g., Bring Your Own Device (BYOD) machines) in their own "zone", wherever they happen to be in the switching fabric, and scan, restrict and/or route their traffic specially.

Integrating security appliance functions with SDN functions has several points of industry significance. The integrated system makes firewall performance be as fast as it can be. Furthermore, the integrated system brings the firewall appliance inside SDN control plane to see virtual topology. In an SDN network, this makes it possible to apply firewalling at zone boundaries based on a (single) firewall policy. Moreover, this integrated system brings us into SDN framework for virtualization technologies.

More often than not, networks including SDNs include one or more network security appliances (or security devices, both terms used interchangeably in this disclosure) (e.g., a firewall, intrusion prevention system (IPS), content filtering gateway devices (web gateway, email gateway), data loss prevention devices, static and/or dynamic threat analysis devices, router and switch ACLs, etc.). In some cases, basic firewalling may be integrated into an SDN (e.g., using OpenFlow), however, these systems do not always work efficiently and may require duplicated function with respect to network security devices.

Network security devices (i.e., security appliances) are deployed at topological choke-points in the network, forcing traffic to go through them. In Software defined networks (SDN), the SDN must simulate the choke-point, routing all traffic through the Network Security Device. Consider two computers, A and B, on adjacent switch ports, but in different SDN zones. The connection from A to B must be routed by SDN in a "trombone" (slow path) through multiple switches to reach the Network Security Device.

This disclosure demonstrates how a network security appliance may work cooperatively with the SDN controller to share the load, using OpenFlow or other suitable protocols to implement a "super fast path" after deep scanning is complete. Such a solution provides a more efficient system. The controller is modified to accept definition of security zones. Traffic between security zones is routed to the Network Security Device, e.g., to a firewall for deep scanning. For connections with large amounts of data, said deep scanning is completed early in the connection, or the policy on the security device may limit the scanning. At this point, the network security device informs the SDN controller, and the connection is rerouted directly, so as to bypass the Network Security Device.

This disclosure explains how the Network Security Device may be removed from the connection after deep scanning is complete, permitting traffic to flow directly between the communicating ports afterwards, which gives optimal throughput. In the example above, the "trombone" through several switches is removed, and traffic flows from A to B on the same switch.

In a typical situation, a transfer is 10-100 MB, and deep scanning is complete after the first 200K of transferred data. Thus, the embodiments disclosed herein can increase the performance for all but a small fraction of the traffic being transferred.

This disclosure shows how traffic can bypass the network security device completely by using Software Defined Networking (e.g. OpenFlow) techniques. This improves performance by permitting an alternate switching path from source to destination that bypasses the security device. Since security devices are expensive and centralized, this is likely to decrease the number of switches that is transitioned by the traffic, and the connection speed is likely to increase.

It should be emphasized that SDN permits improvements to application or network security outside of just making communications faster. Conventional security appliances must be located at network chokepoints in order to guarantee that the required, e.g., inter-zone, traffic transits the security appliance. Since all traffic at the chokepoint must transit the security appliance, it can become very difficult and/or expensive to implement. SDN provides the possibility of distributing security appliances at multiple locations in the network topology. This removes the need for creating network choke points and can simplify or improve network design. Furthermore, the security appliances can be distributed to convenient locations in the topology, perhaps closer to where computation is performed, with the SDN infrastructure ensuring that each such appliance is fed no more traffic than it can handle. Conversely, for a low-bandwidth application, the SDN infrastructure may simplify the security appliance configuration, by routing traffic from distant locations into a smaller number of security devices.

The disclosed embodiments improve efficiency of network security appliances/devices, such as intrusion prevention systems, firewalls, data loss prevention and application gateways; in a data center or other network using SDN. Some embodiments provide the ability to bundle SDN technology with small office network security solutions, permitting remote control of security zones in a small network.

SDN concepts can be integrated into products as complete solutions, so that the products function well in a site that already has a SDN, such as OpenFlow (or some other SDN protocol) deployed; and provide SDN capabilities in a site without a SDN deployed. For example, consider a fully functional firewall product that integrates an OpenFlow switch and OpenFlow controller into the product appliance. If the customer deploys additional OpenFlow switches, the firewall is capable of controlling those "off box" switches, causing the firewall to appear to have unlimited entry and exit ports. If the customer deploys an external SDN controller, the firewall implements an API with this controller to perform its functions. This example works equally well for other SDN protocols besides OpenFlow.

Things become better and faster with SDN.
For instance, firewall integration with SDN controller provides better efficiency by allowing the fast path to run at network speed. Remote definition of zones (e.g., Branch office control, Managed Security Service Provider (MSSP)) is possible. A security appliance can configure scanning of Peer to Peer communications. SDN can enable United Threat Management (UTM), integrated wireless, can apply, e.g., Anti-virus (AV) for drop-in machines (trombone to firewall). UTM is targeted to small businesses, where replacing switches to implement SDN is cost effective. SDN is also effective and low-cost within a virtual infrastructure, e.g., a virtual data center. SDN enables broadcast domain collection of data for, e.g., real time electronic policy orchestrator (ePO) or other centralized security management system, security system optimized for virtual environments. Moreover, SDN enables Dynamic Host Configuration Protocol (DHCP) pools that are immune to Peer to Peer sharing.

Example: Fast Path Through Switch, Bypassing Security Appliance

Firewalls (or any suitable security appliance) are often provisioned in networks to provide security. Network traffic which requires the security application of a firewall is routed from point A to point B through a (centralized) firewall for inspection. The path from point A to point B through the (centralized) firewall for the network, in some cases, requires transit through multiple switches or routers, forming a "network trombone" or "traffic trombone" due to the hub-and-spoke nature of networks. The "trombone effect" can be highly inefficient and can cause latency and bandwidth issues for a network when all traffic from point A to point B must be routed through a firewall.

In an exemplary use case, the SDN environment includes a security appliance, e.g., operating as a firewall, which is inserted in a path from point A to point B to provide security. Firewalling is integrated with a SDN Controller. Firewall is inserted into flows as needed to meet security model. The control plane performs basic firewalling, or any security appliance/application. The firewall performs deep scanning of network traffic. Control plane implements a "fast path", which is a feature providing switch-speed firewalls. In other embodiments, the firewall and SDN controller use an Application Program Interface (API) to communicate, rather than being integrated into the same appliance.

Figure 3A:
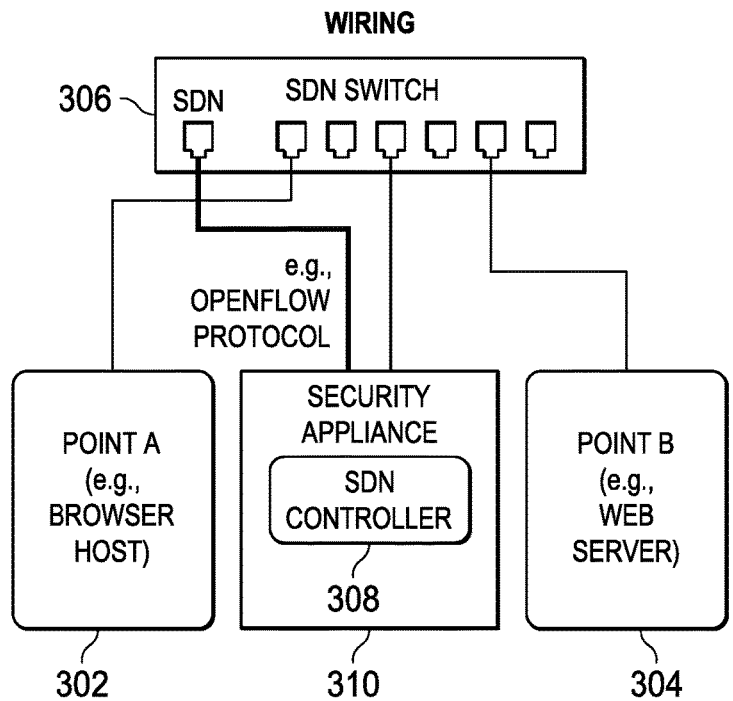
FIG. 3A is a simplified block diagram illustrating the wiring of one or more embodiments of the disclosure.
Figure 3B:
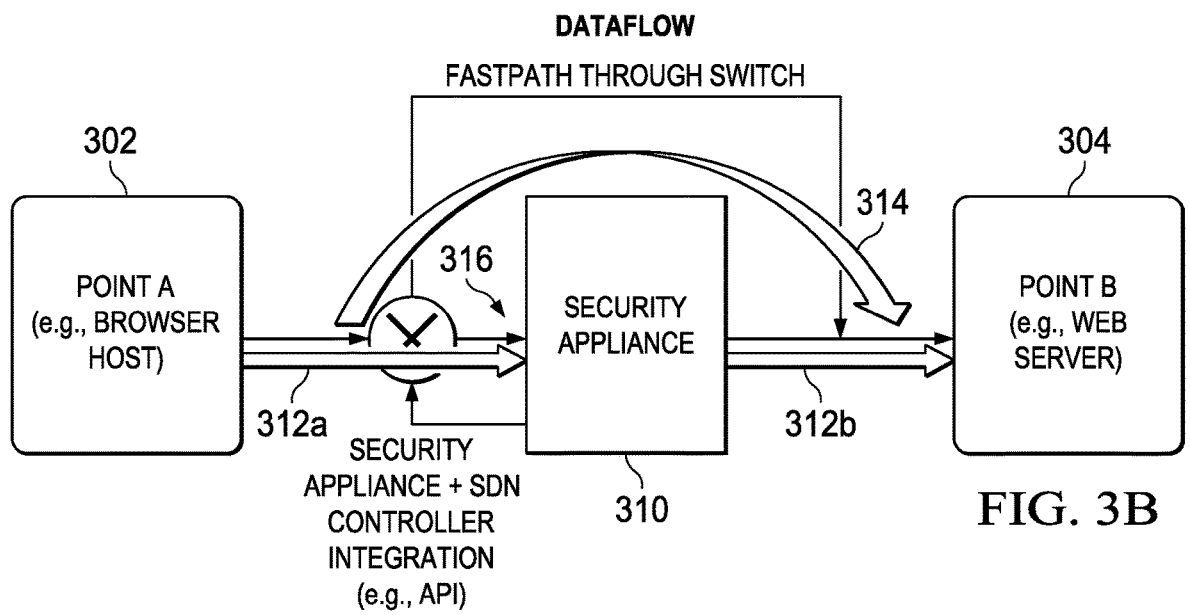
FIG. 3B is a simplified block diagram illustrating the data flow of one or more embodiments of the disclosure corresponding to the wiring in 3A.

FIG. 3A is a simplified block diagram illustrating the wiring of one or more embodiments of the disclosure. FIG. 3B is a simplified block diagram illustrating the data flow of one or more embodiments of the disclosure. In this scenario, point A (e.g., a browser host) is communicably connected/wired to point B 304 through one or more SDN switches (for simplicity, a single SDN switch 306 is shown). Control logic in SDN controller 308 may implement one or more security policies to configure SDN switch 306 to route the data flow from point A 302 to point B 304 through security appliance 310 (which is also connected to SDN switch 306). SDN controller 308 may communicate through an SDN port of SDN switch 306 to configure or reconfigure flow tables of SDN switch 306, using OpenFlow protocol to ensure the data flow is routed through security appliance 310. For instance, SDN controller 308 may be provide control logic to route traffic between point A 302 and point B 304 by inserting (2) flows to enable route 312a from point A 302 to security appliance 310; and route 312b from security appliance 310 to point B 304, as well as suitable routes for reversing the flow. This provides a route composed of routes 312a and 312b.

It is noted that the present disclosure discusses providing a route for data flow from point A 302 to point B 304 (or any two cooperating entities) or from point B 304 to point A 302. It is possible that the data flow between point A 302 and point B 304 traverses the same path in the both directions (symmetric). It is possible that the data flow from point A 302 to point B 304 does not traverse the same path in the opposite direction from point B 304 to point A 302 (asymmetric). For instance, the control logic in SDN controller 308 may implement a security policy which specifies that the data flow from point A 302 to point B 304 traverse through security appliance 310, but that the data flow from point B 304 to point A 302 does not traverse through the security appliance 310 and/or vice versa. In one example, a proxy may be inserted in the path for network traffic from the client to the server but not inserted in the path for network traffic from the server to the client.

Based on its scanning of the connection, security appliance 310 may determine that the data flow is allowed by policy (e.g., by checking whether a URL requested by point A is an approved URL), and the rest of the data flow between point A 302 and point B 304 need not further (or no longer needs to) be inspected by security appliance 310. Accordingly, security appliance 310 notifies SDN controller 308 to implement fast path 314 which bypasses the security appliance by removing the flows previously added to implement routes 312a and 312b and inserting flows to implement route 314, so that the data flow goes directly from point A 302 to point B 304 through SDN switch 306. To that effect, security appliance 310 may transmit the one or more security policies comprises information indicating that the data flow no longer requires scanning by the security appliance to SDN controller 308. In response to receiving the one or more security policies, SDN controller 308 implements the one or more security policies by reconfiguring the control logic, which comprises providing, using SDN controller 308, a second route (fast path 314) between point A 302 and point B 304, wherein the second route bypasses security appliance 310. Because the security appliance typically adds its processing time (i.e., time needed to process data packets) to the latency time between point A 302 and point B 304, fast path 314 (the second route) may be substantially faster than first routes 312a and 312b.

When the security appliance 310 is bypassed, the data flow no longer traverses one or more network links. For instance, the data flow will not traverse through link 316 (i.e., the path indicated by an arrow pointing into security appliance 310). If a traffic monitor is placed on link 316, the traffic monitor will not observe the rest of the data flow once the SDN controller configures the data flow to traverse through fast path 314. The bandwidth for the one or more network links on which the data flow no longer traverses is advantageously decreased or reduced, in some cases, when the data flow traverses through fast path 314.

It is noted that the decision to implement a route which bypasses security appliance 310 may apply to one direction of the data flow between point A 302 and point B 304, but not to both directions. In some embodiments, the decision to implement a route which bypasses security appliance may apply to both directions of the data flow between point A 302 and point B 304.

Example: Data Flow Between Alice and Bob Illustrating Routing and Zoning

Figure 4:
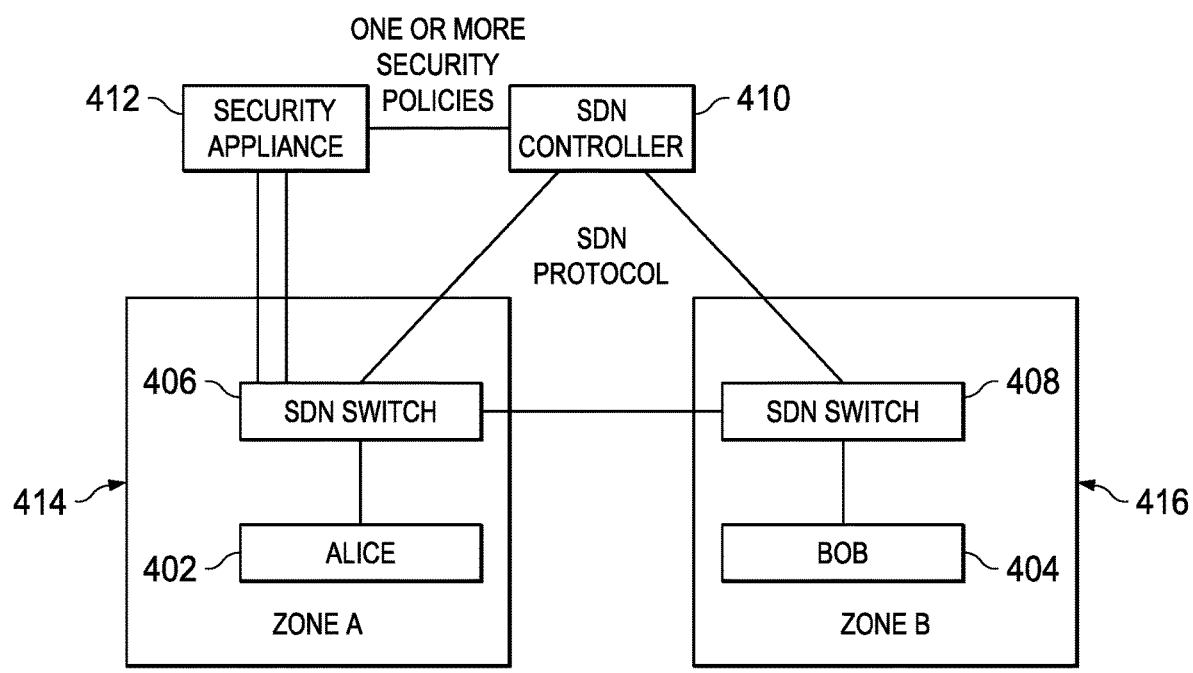
FIG. 4 is a simplified block diagram illustrating the enforcement of one or more security policies using SDN, according to some embodiments of the disclosure.

FIG. 4 is a simplified block diagram illustrating the enforcement of one or more security policies using SDN, according to some embodiments of the disclosure. More specifically, the diagram illustrates provision of security zones and routing according to one or more security policies. The diagram shows Alice 402 (a network node in the SDN environment), Bob 404 (another network node in the SDN environment). Alice 402 is on or communicably connected to SDN switch 406, and Bob 404 is on or communicably connected to SDN switch 408. SDN controller 410 (comprising of one or more SDN controllers) is configured to communicate with and configure SDN switch 406 and SDN switch 408, where the control logic in SDN controller 410 is configured to provide entries to flow tables in SDN switch 406 and SDN switch 408, e.g., using an SDN protocol. Security appliance 412 is provided to communicate one or more security policies to SDN controller 410.

In one embodiment, Alice 402 is a guest host trying to transmit a file to Bob 404, where Bob 404 is a native host. Within the context of this disclosure, a guest host may be a host computer/machine whose security credentials have not been verified or validated, and thus the network/data access rights or privileges for a guest host is usually more restricted than the network/data access rites of a native host, whose security credentials have been verified or validated.

When a packet flows from Alice 402 to Bob 404, the packet may normally transmit a packet through SDN switch 406 and SDN switch 408. However, security appliance 412 may, e.g., using IP addresses, physical ports, and/or Media Access Control (MAC) addresses of Alice 402 and Bob 404, determine that Alice 402 and Bob 404 belong to different zones, and instruct SDN controller 410 to insert security appliance 412 in the path between Alice 402 and Bob 404.

Because Alice 402 is a guest host, an exemplary security policy may specify, using the SDN controller, that Alice 402 should be place in a guest zone or its own zone (e.g., zone A 414) with a particular level of security. Because Bob 404 is a native host, Bob 404 may already been in a particular zone, e.g., zone B 416. Another exemplary security policy may specify, using in the SDN controller, that data flows from Alice 402 (or any hosts in zone A 414) to Bob 404 (or any hosts in zone B 416) should traverse through security appliance 412. The SDN controller 410 may already be configured with such one or more security policies and the control logic already is configured to implement those security policies. In some cases, security appliance 412 may provide those one or more security policies to SDN controller 410 to reconfigure the control logic in SDN controller 410 according to the one or more security policies. The security appliance may suitably provide one or more security policies to configure and/or reconfigure the control logic according to security needs.

In one embodiment, the one or more security policies comprises information indicating that a data flow between a guest host and a native host requires scanning by a security appliance (e.g., security appliance 412). In response to receiving the one or more security policies from security appliance 412, SDN controller 410 reconfigures the control logic such that the SDN environment ensures that a data flow from Alice 402 would traverse the following elements to ultimately reach Bob 404, in this order: (1) SDN switch 406, (2) security appliance 412, (3) SDN switch 406 (optional, occurs if security appliance 412 has no access to SDN switch 408 directly), and (4) SDN switch 408. In effect, SDN controller 410 is configured to provide a route between the guest host and the native host, wherein the route traverses through the security appliance for added security in response to receiving the one or more security policies. SDN controller 410 implements a routing/switching algorithm to generate flow table entries for at least SDN switch 406 to route the data flow from Alice 402 to security appliance 412 before reaching Bob 404.

In one embodiment, the one or more security policies comprises information indicating that a data flow between a guest host and a native host need not further be scanned (or no longer requires scanning) by security appliance 412. In response to receiving the one or more security policies from security appliance 412, SDN controller 410 reconfigures the control logic such that a data flow from Alice 402 would traverse the following elements to reach Bob 404, in this order: (1) SDN switch 406, and (2) SDN switch 408. In effect, SDN controller 410 is configured to provide a faster route between the guest host and the native host, wherein the faster route bypasses security appliance 412 in response to receiving the one or more security policies. SDN controller 410 implements a routing algorithm to generate flow table entries for at least SDN switch 406 to route the data flow from Alice 402 directly to SDN switch 408.

In one embodiment, providing control logic using SDN controller 410 to implement one or more security zones comprises configuring security zones in the SDN environment for carrying network traffic through configuring flow tables in SDN switch 406 and SDN switch 408, wherein the security zones provide different levels of security for network and data access. Proper routing can ensure that network traffic flows to appropriate networks, according to the network/data access rights for a particular security zone.

Security zones are generally used as a way to define a set of network/data access rights applicable to a particular business unit within an enterprise network. For instance, a security zone may be provided for guests. A security zone may be provided for system administrators. A security zone may be provided for auditors. One or more hosts may belong to a security zone, where the one or more hosts would have a set of network/data access rights corresponding to that security zone. Within the context of a security model, security zones may relate to network isolation, such that network traffic is restricted from traveling between zones, an Intranet, or the Internet. Security zones may also relate to specific restriction/policies on network traffic between zones. For instance, a security policy may specify that data flows from security zone X to security zone Y must be encrypted. Another security policy may specify that data flows from security zone Y to any other security zone must traverse through a data loss prevention system.

In one embodiment, the one or more security policies comprises information which adds, removes, and/or modifies the security zones. By applying a suitable routing algorithm which takes the one or more security policies as input, SDN controller 410 can reconfigure the control logic to implement addition/modification/removal of security zones according to the one or more security policies. For instance, the one or more security policies comprises information indicating that a guest host (e.g., Alice 402) belongs to a particular security zone. In response to receiving the one or more security policies, the SDN controller (the SDN controller 410) can reconfigure the control logic to implement those policies. For instance, the SDN controller can add the particular security zone to the SDN environment, and/or add the guest host to the particular security zone (or an existing security zone), in response to receiving the one or more security policies.

Demonstration of Fast Path

Figure 5A:
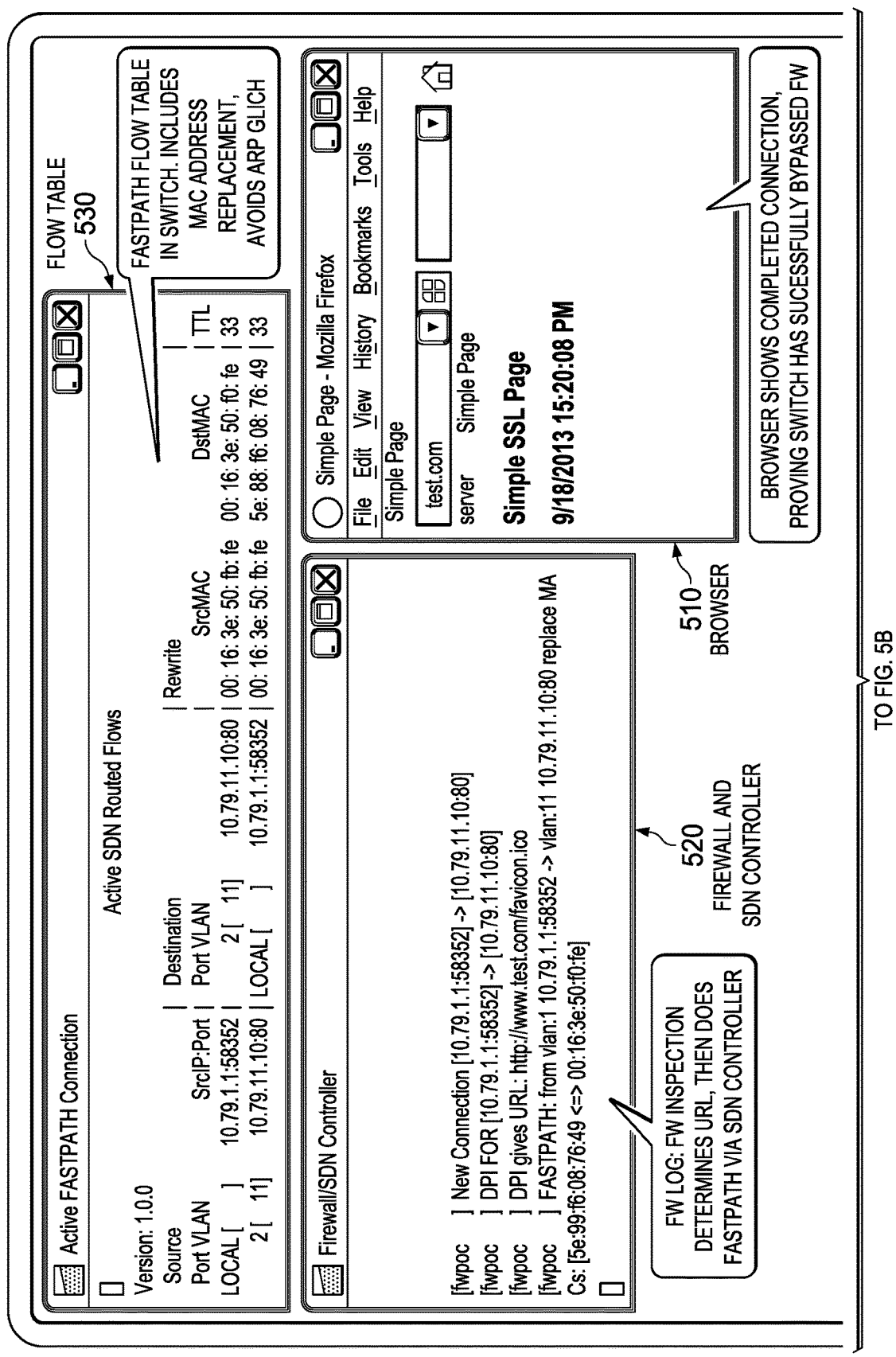

FIGS. 5A-B show an annotated screen shot showing the results of bypassing a firewall (FW) using SDN, according to some embodiments of the disclosure. The wiring diagram illustrating this demonstration is given in FIG. 3A and the flow diagram illustrating the demonstration is given in FIG. 3B. Other embodiments are also possible. The screen shot comprising of a plurality of windows illustrates an example demonstration where a browser host (shown as browser 510) makes a data connection with a server to access a webpage. The firewall activity is shown as firewall and SDN controller 520 which is a firewall which is optionally integrated with a SDN controller. The flow table of an SDN switch is shown as flow table 530. A traffic monitor (sniffer) is shown as traffic monitor 540. Referring back to FIG. 3B, the traffic monitor may be monitoring traffic on link 316 where an arrow points to security appliance 310. Upon detection that the security appliance no longer needs to scan the traffic, the connection is routed through a fast path, in response to the security appliance issuing a "FASTPATH" request, asking the SDN controller to configure a different routing to improve efficiency and connection speeds.

When the browser host attempts to make a connection with the host, the network traffic from the browser host is scanned by the firewall. As shown in firewall and SDN controller 520, the firewall detects the connection ("New Connection [10.79.1.1:58352]→[10.79.11.10:80]") and uses deep packet inspection (DPI) for the packet and sees the URL ("DPI gives URL: http://www.test.com/favicon.ico"). The firewall approves the connection and determines that DPI is no longer needed, and provides a fast path security policy to an SDN controller ("FASTPATH: from vlan:1 10.79.1.1.:58352→vlan:11 10.79.11.10:80 replace MACs: [5e:88:f6:08:76:49<=>00:16:3e:50:f0:fe]"). The SDN controller takes the security policy, and reconfigures the flow table of the SDN switch accordingly such that the firewall is bypassed (as shown in flow table 530, the flow table has been so updated). Examining the packet dump at the firewall in traffic monitor 540 shows that the firewall no longer sees the HTTP connection after fast path is implemented. The firewall is effectively bypassed.

Example: Better Routing Through SDN

Within the present disclosure, several illustrative examples have been explained where a fast path, a faster path, or a super fast path (collectively referred to as "the faster path") is provided when a security appliance is bypassed. In some embodiments, the faster path and/or the super fast path has a shorter latency when compared to the slow path which traverses through the security appliance. In some embodiments, the path which bypasses the security appliance is not necessarily a faster path, but simply "a better path". For example, the better path may be less utilized, and the overall network utilization is improved when the data flow is diverted to the better path (even if the better path is slower than the slow path which traverses through the security appliance). In another example, the better path may be cheaper, and the overall cost for transporting the data flow is decreased/improved when the data flow is diverted to the better path. It is envisioned that the SDN controller may use any suitable metric(s) and/or external information accessed via Application Programming Interfaces (APIs) for reconfiguring the control logic to provide the better path (i.e., a more desirable path when compared to the slow path).

Exemplary System

A Network Security device/appliance (e.g., a security appliance) may perform one or more of the following:
Detect new flows and associates a connection with that flow
Reassemble, scan and detect attacks within a flow
Possibly rewrite the packets of a flow
Determine that a flow no longer needs to be scanned or processed directly by the Network Security Device
Communicate with a Software Defined Network (SDN) Controller that the flow no longer needs to be directed at the Network Security Device or any other aspects of the security model using one or more security policies communicated to the SDN controller A Software Defined Network (SDN) Controller working with the Network Security Device may perform one or more of the following:
Configure the flow tables of one or more SDN switches to work with a Network Security Device
Modify the flow tables of switches when a Network Security Device determines the flow no longer needs to be scanned
Update control logic of the SDN controller to implement one or more security policies received from the Network Security Device A Network Defined Network Switch (e.g., SDN switch) may perform one or more of the following functions, some of which are outlined in the OpenFlow Switch Specification 1.3.2 (published Apr. 25, 2013 by the Open Networking Foundation; Wire Protocol 0x04):
Be configured as to its flow tables by a controlling SDN Controller or a backup controlling SDN controller;
Forward packets from one port of the switch to one or more ports of a switch, based on its flow tables;
Drop packets with particular packet characteristics from one or more switch ports, based on its flow tables;
Replace zero or more fields in packets with particular characteristics, based on its flow tables (i.e., possibly rewriting field(s) in packets, e.g., for Address Resolution Protocol (ARP) to work properly);
Rewrite sequence numbers in certain packets to implement TCP splicing (not outlined in the OpenFlow Switch Specification referenced above);
Implement byte boundaries to keep track of parts of a data flow if a flow table entries is applicable to only a certain number of bytes (or other suitable units of data) of the data flow as measured at any one or more layers in the OSI model (not outlined in the OpenFlow Switch Specification referenced above); and
Forward flow information or flow packets to an SDN controller and/or a backup SDN controller.

Examples: Using SDN to Implement Various Exemplary Paths/Routes

FIGS. 6A-D are simplified block diagrams illustrating different exemplary implementations of security policies using SDN, according to some embodiments of the disclosure. These security policies may be implemented in the SDN environment using any of the methods disclosed and illustrated herein. The SDN controller configures and/or reconfigures the control logic such that SDN switches in the SDN environment can be configured to implement those security policies.

Specifically FIG. 6A illustrates a general exemplary system, comprising two networks: Internet 602 (denoted as a cloud throughout FIGS. 6A-C) and inside network 604 (e.g., an enterprise network, a network which may restrict access by guests or untrusted hosts, an intranet, a network where level of security is elevated). Native host 608 and guest host 610 are located on inside network 604. Security appliance 606 integrated with an SDN controller is provided as needed for security. The SDN controller interfaces with the network using a suitable SDN protocol, such as OpenFlow to configure routing in the SDN environment such that one or more security policies can be implemented in the network. While this diagram shows security appliance 606 integrated with an SDN controller (e.g., an OpenFlow controller), it is envisioned that the SDN controller may be provided separately (not integrated with security appliance 606). An inspection path (a slow path) traverses through security appliance 606. A fast path bypasses security appliance 606.

FIG. 6B shows an exemplary security policy where SDN switches in the SDN environment routes a data flow from native host 608 to Internet 602 without inspection, i.e., through the fast path and routes a data flow from the guest host 610 is routed to Internet 602 without inspection. The diagram demonstrates basic firewalling through switch, SDN (e.g., OpenFlow) controller reconfigures control plane to allow native host 608 and guest host 610 to connect to Internet 602 via the Fast Path.

FIG. 6C shows an exemplary security policy where a data flow from native host 608 to Internet 602 (or from Internet 602 to native host 608) is scanned initially by security appliance 606, until scanning is no longer required. Then the data flow falls to a fast path where the security appliance is bypassed. The figure demonstrates deep scanning in firewall with a fall back to fast path. Depending on the implementation the routing through fast path or the slow path through the security appliance may be enforced based on boundaries within a data flow.

FIG. 6D shows an exemplary security policy where the SDN (e.g., OpenFlow) controller can permit guest host 610 to access Internet 602 (bypassing security appliance 606) but a data flow from guest host 610 to native host 608 is scanned by security appliance 606 for added security. This figure further demonstrates automatic zoning of Bring Your Own Device (BYOD). Guest host 610 is detected by SDN controller; interaction between guest host 610 and native host 608 is routed through scanning device (e.g., firewall, IPS) for added security. Although not shown, the SDN controller can reconfigure the control logic to provide fast path if security appliance determines that scanning is no longer needed, or determines guest host 610 can be safely added to a different security zone where scanning by security appliance 606 is no longer needed (e.g., guest host 610 being added to the same zone as native host 608).

Example: Super Fast Path

Figure 7:
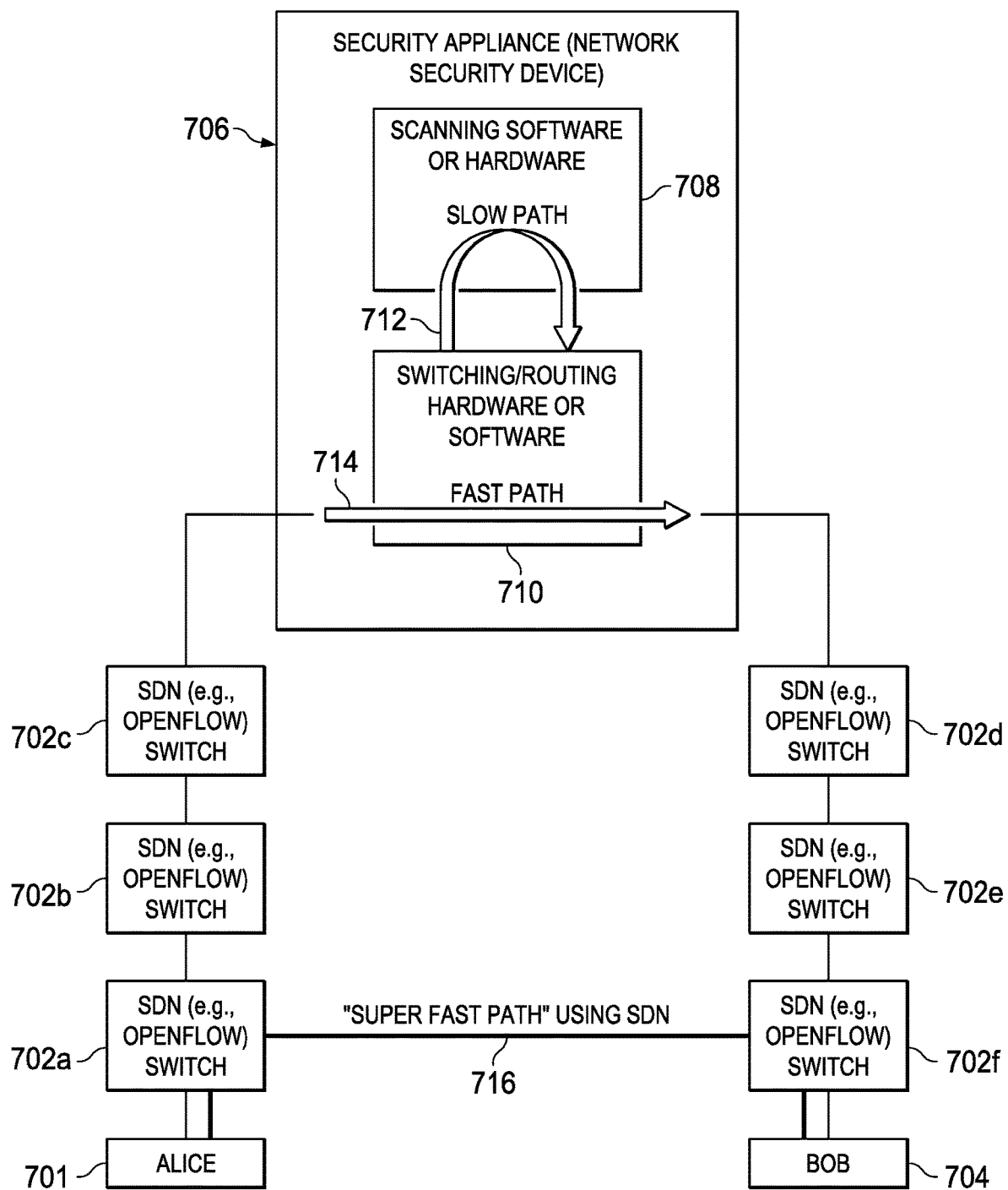
FIG. 7 is a simplified block diagram illustrating providing a "super fast path" at network speeds, according to some embodiments of the disclosure.

FIG. 7 is a simplified block diagram illustrating providing a "super fast path" 716 at network speeds, according to some embodiments of the disclosure. The system shows network traffic from Alice 701 to Bob 704 traversing over a slow path through (in this sequence) switch 702a, switch 702b, switch 702c, switch 702d, switch 702e, switch 702f for scanning by security appliance 706. This path is called a "trombone" path, because it flows out to the security device, then back close to where it originated, like the slide of a trombone. Generally, security appliance 706 (e.g., network security device) can use custom hardware to implement a "fast path" 714 to bypass scanning of the packets and simply forwarding the packets without inspecting them. However, the "trombone" path going through all of switches 702a-f is still in play. SDN controller coordination with security appliance 706 enables replacement of the "fast path" 714 with a "super fast path" 716 which routes network traffic from Alice 701 from switch 702a to switch 702f while bypassing switch 702b, switch 702c, switch 702d, switch 702e, and security appliance 706. This "super fast path" 716 has its own routing which can be provided by the control logic in the SDN controller.

"Fast path" 714 via a security device, i.e., skipping the processing of the Network Security Device enables high packet rates at the network location of the device, but still requires the routing to be the same as before. SDN (e.g., OpenFlow) controller integration permits "super fast path" 716 where the "super fast path" 716 has its own routing. When a new connection starts, SDN switches routes up through the security device. When the security device is finished with the connection, it hands it back to the SDN (e.g., OpenFlow) controller to "fast path" 714. But now the controller doesn't need to even include the security device in the connection. It can transmit the data using an optimal route, and fast path traffic can now flow at optimal network speed through the "super fast path" 716.

Example: Fall Back to Slow Path; Limited Hand-Off of the Flow

Besides being able to provide the data flow from point A to point B through a fast path, or a super fast path, byte boundaries may be added by modifying an existing SDN protocol, e.g. OpenFlow, or by providing a new protocol which implements byte boundaries. SDN switches may have the added ability to keep track of byte boundaries within a flow. Byte boundaries can permit fast path for multi-transactional protocols such as HTTP/1.1 or SMB, which can benefit from fast path within a particular transaction of a data flow, but must return to the firewall for deep packet inspection (DPI) at the start of the subsequent transaction.

In one embodiment, the one or more security policies for the SDN environment from the security appliance indicates network traffic for a particular number of bytes (or any other suitable units of data, such as protocol data units, as measured at any one or more layers of the OSI model) of network traffic can bypass the security appliance. Furthermore, one or more SDN switches in the SDN environment is configured to route network traffic, after the particular number of bytes of network traffic has bypassed the security appliance, back though the security appliance.

In one embodiment, the one or more security policies for the SDN environment from the security appliance indicates network traffic for a particular number of bytes (or any other suitable units of data as measured at any one or more layers of the OSI model) of network traffic must traverse the security appliance. Furthermore, one or more SDN switches in the SDN environment is configured to after routing the particular number of bytes of network traffic through the security appliance, route the one or more following bytes of network traffic such that the security appliance is bypassed.

In a broader sense, the one or more security policies for the SDN environment from the security appliance may indicate any particular amount of network data which can bypass the security appliance or must traverse the security appliance. The particular amount of network data is measurable by a particular number of units of data, a particular number of bytes, or a particular number of protocol data units as measured at any one of the Open Systems Interconnection layers. Then, one or more SDN switches in the SDN environment is configured to (1) after the particular amount of network traffic has bypassed the security appliance, route subsequent network traffic through the security appliance, or (2) after routing the particular amount of network traffic through the security appliance, route the subsequent network traffic such that the security appliance is bypassed.

To enable the SDN switches to offer the feature of "limited handoff" of the flow, the SDN controller may insert appropriate flow entry or flow entries of different priorities in the SDN environment to route the flow over a particular path for a particular number of bytes then re-route the flow through the security appliance once the particular number of bytes have been counted. Accordingly, one or more flow entries may be provided to the SDN switches which have the particular number of bytes associated with it. After receiving the flow entries having the particular number of bytes, one or more SDN switches can commence to count the number of bytes for the flow to implement the particular path for the particular number of bytes.

Current SDN technology does not have the ability to count bytes (or other units of data or protocol data units) in the flow. The ability may be provided to an SDN switch (e.g. test for sequence number greater than a value, or maintain a counter for counting bytes of data payloads). A flow could then be partially examined in the security appliance, handed to the switch for so many bytes of TCP traffic (i.e., flow table entries are conditioned/dependent on the number of bytes already being routed by the TCP protocol using a particular flow table entry for a particular TCP stream), then continued to be examined in the security appliance. Other embodiments may use other protocols (e.g. Stream Control Transport Protocol (SCTP), File Transfer Protocol (FTP), Tunneled Protocols over HTTP), e.g., where the number of bytes or the number of other units of data is measured at a different protocol in any one or more of the layers of the OSI model. Examples include a (web) proxy that determines that the response from a server does not need to be examined (e.g. GIF image), the proxy could use the length field to determine the number of bytes that could be passed through the switch. The flow would be programmed with this information and the switch would then modify the flow to start sending packets to the security appliance once so many bytes have passed through the flow. Examples of other protocols besides TCP include Internet Protocol traffic within GRE tunnels, protocols layered on SCTP, Abstract Syntax Notation One (ASN.1) encoded data in any protocol so encoded. Other embodiments count other protocol data units (PDUs) or units of data, or units of network traffic besides bytes, e.g., number of packets containing voice data transmitted over Real-time Transport Protocol (RTP) and controlled by Session Initiated Protocol (SIP), number of packets being transported at the OSI layer, number of bits, number of nibbles, number of encoded units, number of decoded units, number of frames, etc. Units of data are measurable units of information or data, where the measurement or the unit is specified in a protocol of a given layer.

In an example, browser software uses HTTP/1.1 to request multiple transactions per connection over a single data flow. The browser sends this (simplified) HTTP/1.1 request:

HTTP GET/mainpage.html HTTP/1.1\r\n
Connection: Keep-Alive\r\n
\r\n

In this HTTP GET transaction request, the "Keep-Alive" primitive permits the server to keep the connection alive for multiple transactions. The \r\n represents a newline sequence (CR followed by NL). Then the HTTP server responds with:

HTTP/1.1 200 OK\r\n
Content-Length: 1000000\r\n
\r\n
<one million bytes of content from/mainpage.html>

At this point, it is advantageous for the security device to super fast path the connection via the SDN controller, as described herein. However, HTTP/1.1 permits a second transaction on the same data flow to come after this page (i.e., after one million bytes). For example, after receiving one million bytes of/maintain.html from the server, the browser may next request a second transaction on the same data flow:

<one millionth byte is received>
HTTP GET/dangerouspage.html HTTP/1.1\r\n
Connection: Keep-Alive\r\n
\r\n If the previous transaction has been sent to super fast path in the SDN controller, this second transaction is no longer transiting the security appliance so it cannot be scanned.

To permit early transactions in a data flow to be sent to super fast path via SDN, but still scan later transactions, the security appliance instructs the SDN controller to use a byte count data flow in the SDN switch. The SDN controller programs the switch with flows that contain a byte count, causing them to expire after a fixed number of bytes of data has been processed, here, one million bytes. Subsequent data on the flow is then transmitted back to the SDN controller, which can insert flows to allow inspection of the next transaction via the slow path through the security appliance.

The following table illustrates the flow of data and the transition from slow path to fast path, and back to slow path.

| Time | Client Sends | Server Sends | Flows in the SDN Controller |
|---|---|---|---|
| 0 | HTTP GET /mainpage.html HTTP/1.1\r\n Connection: Keep-Alive\r\n \r\n | | Slow path: flows lead to security appliance and from it. |
| 1 | | HTTP/1.1 200 OK\r\n Content-Length: 1000000\r\n \r\n | Slow path: flows lead to security appliance and from it. |
| 2 | | <one million bytes of content from /mainpage.html> | Fast path: flows bypass the security appliance with a byte count forcing them to expire after 1,000,000 bytes. |
| 3 | HTTP GET /dangerouspage.html HTTP/1.1\r\n Connection: Keep-Alive\r\n \r\n | | Slow path: flows lead to security appliance and from it. |

Example: SDN Used in Small Office/Home Office (SOHO), Office Building Networks

Figure 8A:
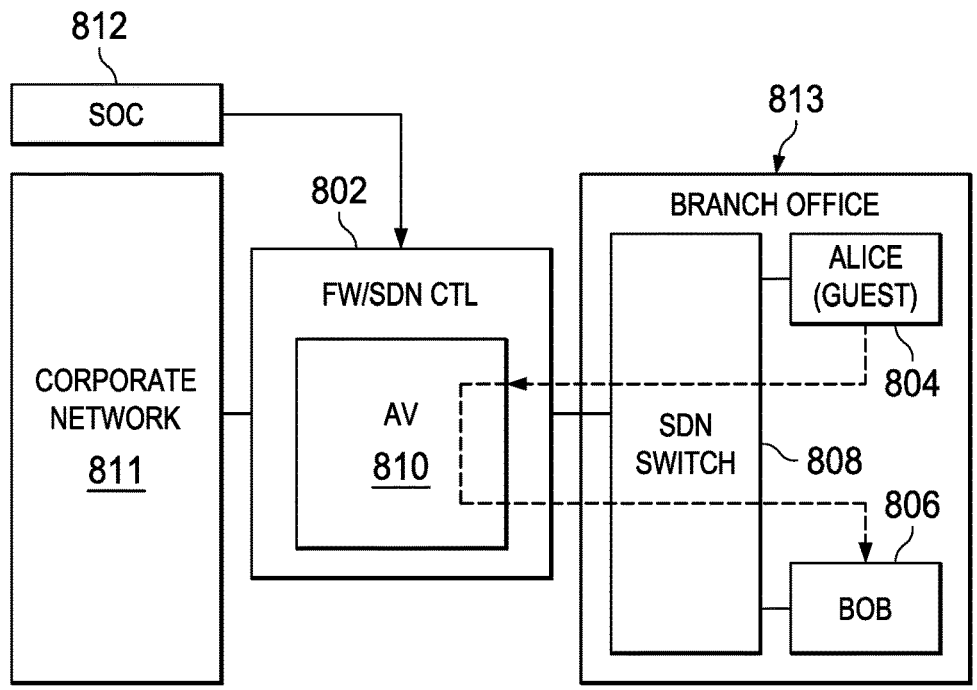
FIG. 8A-B are simplified block diagrams illustrating different exemplary implementations of security policies using SDN at a branch office, according to some embodiments of the disclosure.
Figure 8B:
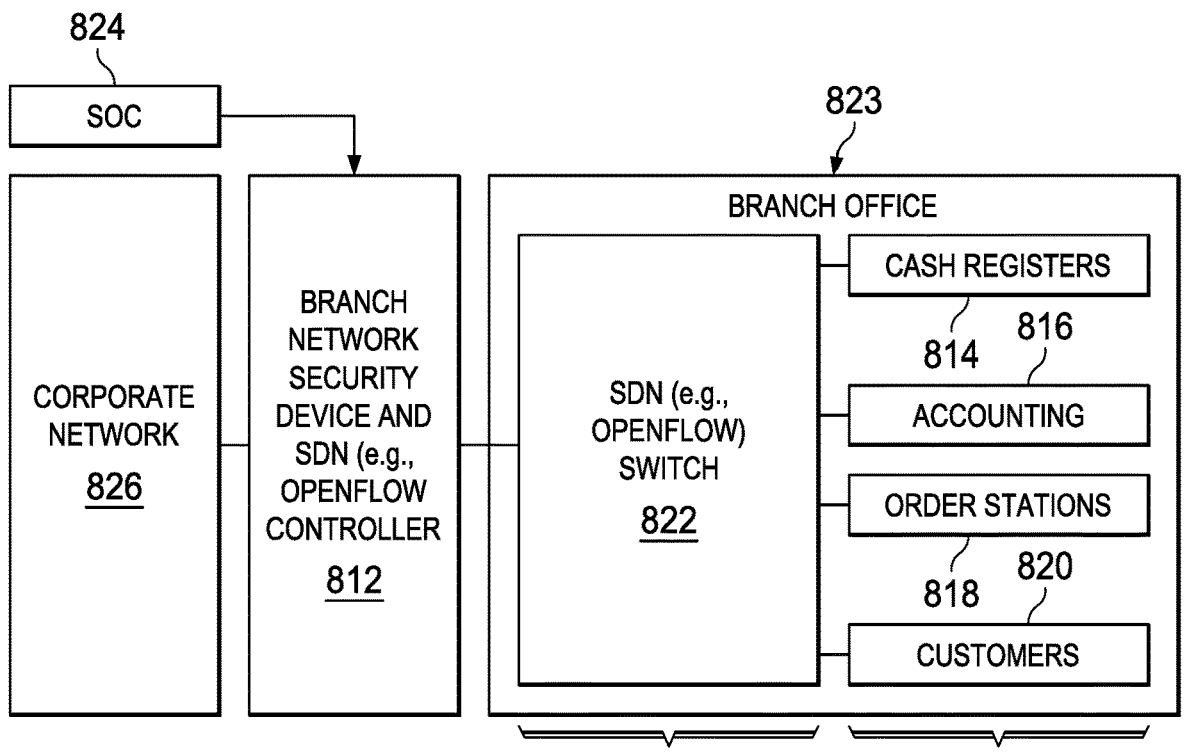

FIG. 8A-B are simplified block diagrams illustrating different exemplary implementations of security policies using SDN at a branch office 813 (or home office, or small to medium sized business/enterprise office, campus, building, etc.), according to some embodiments of the disclosure. As shown in FIG. 8A, firewall 802 (optionally integrated with an SDN controller) can insert itself between two peers, a (guest) host (e.g., Alice 804) and (native) host (e.g., Bob 806) located in a branch office by configuring SDN controller's control logic to cause SDN switch 808 to route network traffic from Alice 804 to Bob 806 through firewall 802. As an example, an anti-virus scanner 810 can scan peer-to-peer traffic. If desired, the firewall 802 and the SDN environment can be configured remotely from a security operations center (SOC) 812. When scanning is no longer needed, the firewall 802 can provide a security policy indicating that routing of the rest of the data flow from Alice 804 to Bob 806 no longer should traverse to firewall 802. SDN controller may then configure SDN switch 808 accordingly. SDN controller may also insert firewall 802 between Alice 804 and corporate network 811 for certain data flows, but not insert firewall 802 between Bob 806 and corporate network 811. In some embodiments, the Internet replaces corporate network 811, and the firewall and SDN controller 802 are provisioned between a small business and the Intranet, such that firewall and SDN policy is configured locally or over the Intranet.

FIG. 8B shows a branch network security device 812 (optionally integrated with an SDN controller) for branch office 823. Branch network security device 812 implements one or more security zones (e.g., cash registers 814, accounting 816, order stations 818, and customers 820) for branch office 823 by configuring SDN switch 822. The branch network security device 812 enables users to create and manage zones, dynamically and remotely, from a security operations center (SOC) 824.

One great benefit of this feature is the ability to create zones on the other side of the world (remotely): Typically, security zones are created through analysis of the business function. This is particularly hard in remote (e.g., branch office) networks, because they are small and located far away from network security operators. SDN concepts can help. A small branch office has a small switching infrastructure. Replace it with low-cost SDN switches. Put the SDN controller in the branch firewall. Now the system administrator can sit down in the SOC 824 and define security zones in the branch office 823 as part of the firewall policy. If the branch office 823 is larger, the benefit may also be greater. For example, a retail store might require more switch replacements, but the ability to provide for customer accessible portions of the network without security risk may be worth the investment. In some embodiments, the Internet replaces corporate network 826, and the firewall and SDN controller 812 are provisioned between a small business and the Intranet, such that firewall and SDN policy is configured locally or over the Intranet.

Example: SDN Switch Fronts Security Appliance

Intrusion Prevention Systems (IPS), Firewalls (FW), Data Loss Prevention (DLP) systems sometimes have an integrated switch, this exemplary implementation replaces the switch with an SDN switch. The SDN switch can use internal VLANs in order to distinguish each port of the switch, the security appliance will then route traffic. In addition a SDN Controller will be integrated into the security appliance allowing fast path of data through the switch by reprogramming the flows.

Figure 9:
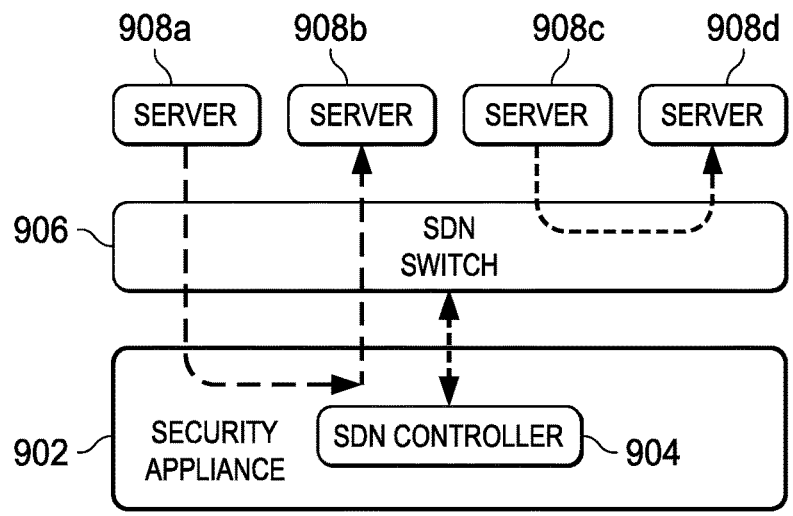
FIG. 9 is a simplified block diagram illustrating providing a route between two servers which bypasses or has in the route a security appliance having an SDN controller and an integrated SDN switch, according to some embodiments of the disclosure.

FIG. 9 is a simplified block diagram illustrating providing a route between two servers 908a and 908b which bypasses a security appliance 902 having an SDN controller 904 and an integrated SDN switch 906, according to some embodiments of the disclosure. In this case, security appliance 902 is (optionally) integrated with the SDN controller 904. The security appliance 902 may be integrated with SDN switch 906 (one of the one or more SDN switches of an SDN environment, replacing an otherwise regular switch), and wherein SDN switch 906 is configured to use internal Virtual Local Area Networks to distinguish ports of SDN switch 906 representing different security zones.

In some embodiments, at least one of the one or more SDN switches such as SDN switch 906 is configured to rewrite zero or more fields of the packets of the network traffic to indicate to the security appliance the switch port or security zone the packet was originally received and/or to direct the packets to bypass the security appliance. SDN switch 906 routes a data flow from server 908a though security appliance 902 before reaching server 908b. SDN switch 906 routes a data flow from server 908c to 908d and bypasses security appliance 902 in response to one or more security policies from security appliance 902. The security policies instructs SDN controller 904 to configure SDN switch 906 accordingly.

Example: Avoiding Trombone Path in SDN Mesh

Figure 10:
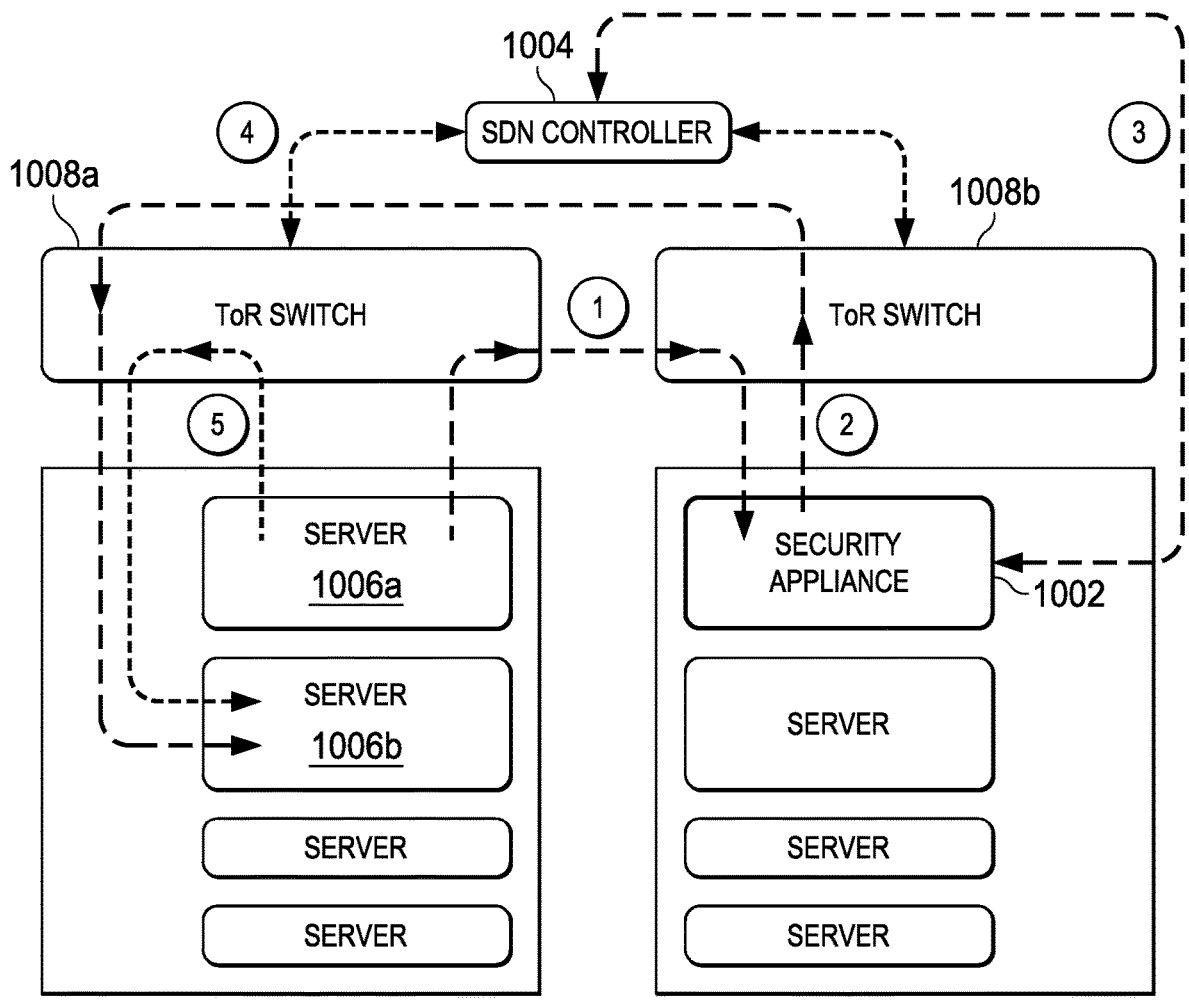
FIG. 10 is a simplified block diagram illustrating providing a route between two servers located on the same switch which bypasses or has in the route a security appliance on another switch using an SDN controller, according to some embodiments of the disclosure.

FIG. 10 is a simplified block diagram illustrating providing a route between two servers located on the same switch which bypasses a security appliance on another switch using an SDN controller, according to some embodiments of the disclosure. Security appliance 1002 (e.g., IPS/FW/DLP) is situated somewhere in the SDN network and SDN controller 1004 routes the traffic from server 1006a to 1006b through security appliance 1002. Server 1006a and 1008b are shown to be on the same switch, i.e., top of rack (ToR) switch 1008a, and security appliance 1002 is on a different switch, i.e., ToR switch 1008b. In order for traffic to be scanned by security appliance 1002, a data flow from server 1006a travels on a slow path through top of rack (ToR) switch 1008a, then to top of rack switch 1008b to reach security appliance 1002. After scanning, the data flow travels to ToR switch 1008b to ToR switch 1008a to reach server 1006b.

At some point, security appliance 1002 may determine that the traffic can be "fast pathed" and program the local switches (ToR switch 1008a and ToR switch 1008b) using SDN controller 1004 by providing the security policy to SDN controller 1004 to optimize traffic. Note that security appliance 1002 could be physical appliance or a Virtual Security Appliance (VSA). Multiple VSA may exist within the mesh, which may be automatically provisioned based on current workload (e.g., through elastic security). The numbered flows in the FIGURE can be annotated as follows:

1) Flow routed through SDN mesh to security appliance 1002
2) Security appliance 1002 inspects flow and may determine to fast path flow
3) Security appliance 1002 sends request to fast path flow to north bound interface of SDN controller 1004
4) SDN controller 1004 modifies flow table of affected switches
5) SDN switch(s) (e.g., ToR Switch 1008a) establishes optimized route for flow In response to receiving the security policy indicating that the data flow no longer has to flow through security appliance 1002, the rest of the data flow can flow from server 1006a to ToR switch 1008a, and directly to server 1006b, bypassing ToR switch 1008b and security appliance 1002.

Example: TCP Splicing

Figure 11A:
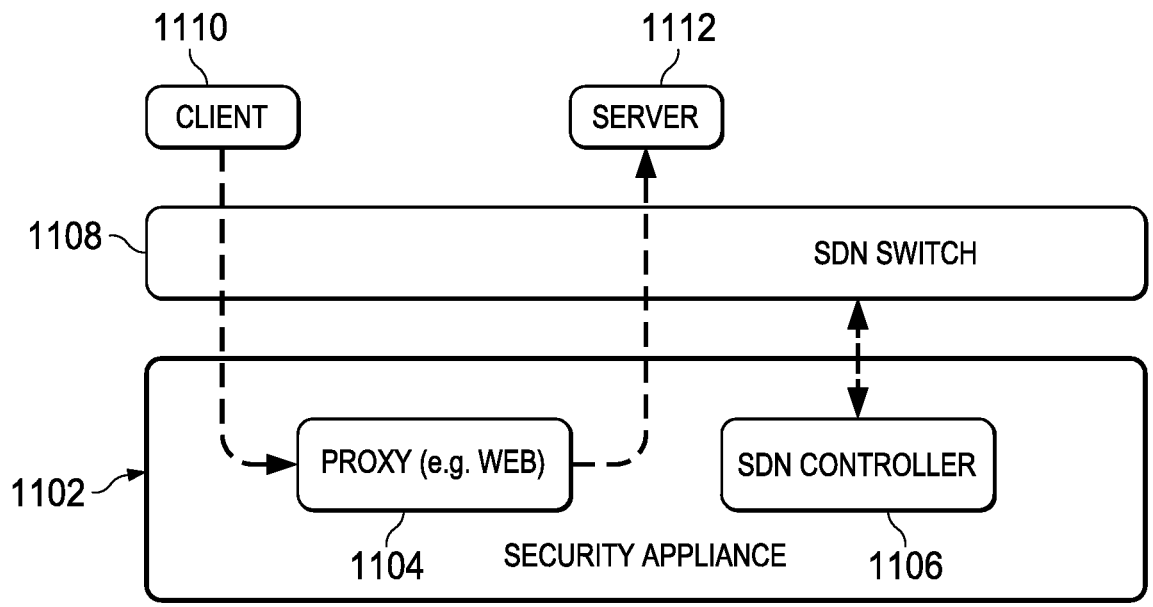
FIG. 11A is simplified block diagram illustrating using a proxy in a route from a client to a server, according to some embodiments of the disclosure.
Figure 11B:
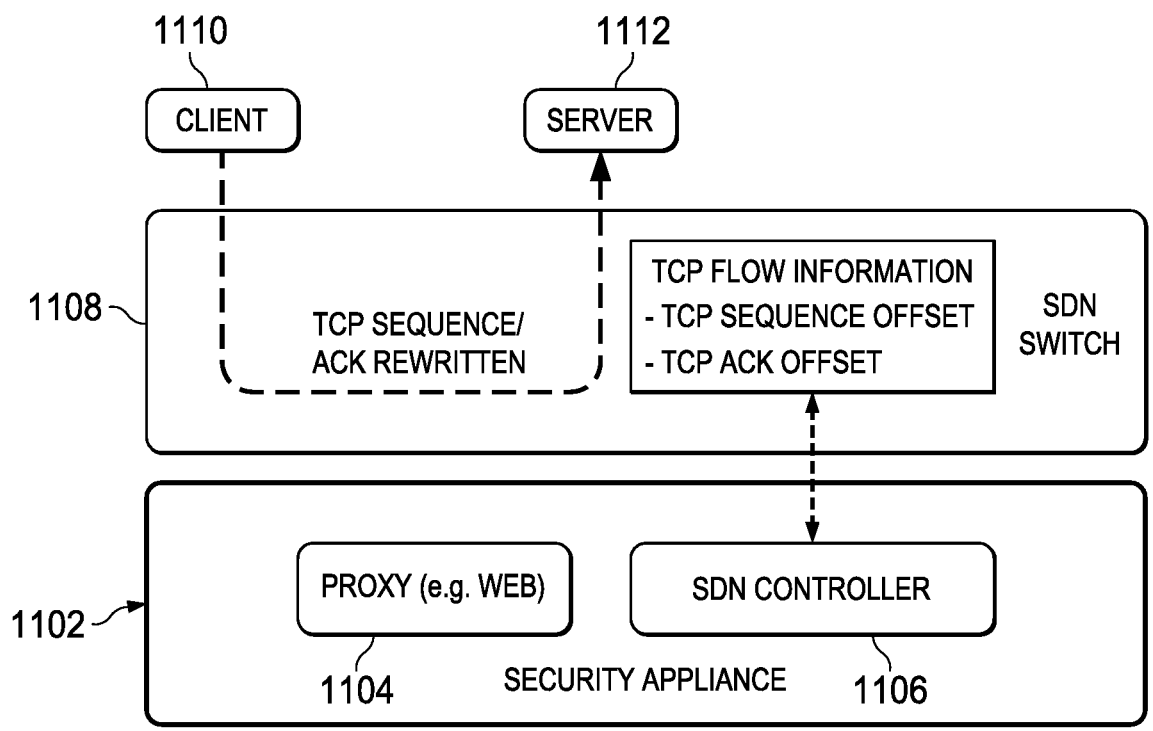
FIG. 11B is a simplified block diagram illustrating bypassing the proxy and rewriting Sequence and Ack numbers, according to some embodiments of the disclosure.

Some security measures require that connections be mediated by a proxy or security gateway which terminates the source connection at the proxy and forwards data to and from a second connection to the intended destination. It is desirable to apply fast path techniques to proxies, but the nature of the proxy makes it difficult, except for a proxy in user-mode and a fast path in kernel-mode of an operating system, such as Linux or FreeBSD. FIG. 11A is simplified block diagram illustrating using a (web) proxy in a route from a client to a server, according to some embodiments of the disclosure, and FIG. 11B is a simplified block diagram illustrating bypassing the (web) proxy and rewriting Sequence and Ack numbers, according to some embodiments of the disclosure. Since proxies typically terminate both ends of a flow and may rewrite packets within the flow thereby changing the length and number of packets, the TCP sequence numbers and acknowledgment numbers in the flow are changed by the proxy. Current SDN technology does not include the ability to modify the TCP sequence and acknowledgement numbers of the flow. The ability to modify the sequence and acknowledgement numbers may be provided to the SDN switch. A proxy (e.g. a web gateway) would then be able to hand off the flow to the SDN switch after determining the flow was allowed (e.g. after reading the URL). The SDN switch would then effectively serve as the entity for terminating the data flow. This would allow for fast path of flows through a proxy. This technique applies equally well to embodiments which make use of transparent proxies and embodiments which make use of explicit (i.e., non-transparent) proxies.

One or more of following information would be handed to the switch: TCP Sequence of client flow, TCP Ack of client flow, TCP Sequence of server flow, and TCP Ack of server flow. The switch would then use the delta between the appropriate Sequence and Ack (client/server and server/client) to calculate an offset to be added to the sequence and Ack numbers as packets passed through the switch. This case is not limited to the immediate adjacent switch, the hand off could occur to any switch in the SDN mesh. The SDN controller, in some embodiments, could calculate the offset and provide the offset to the SDN switch instead. In other embodiments the Security Appliance may calculate the offset and provide the offset to the SDN controller. The SDN switch may be programmed to drop packets, or respond with TCP ACK packets, that occur before the TCP Sequence of the either the Client or Server flow entrie(s).

In one embodiment, shown in FIG. 11A, security appliance 1102 having (web) proxy 1104 implements a security policy to inspect traffic from client 1110 to server 1112 and provides the policy to SDN controller 1106. According to this security policy, SDN controller 1106 has control logic which configures SDN switch 1108 to implement a first route between client 1110 and server 1112 in the SDN environment for carrying network traffic of a data flow between client 1110 and server 1112. The first route traverses through security appliance 1102 and specifically, (web) proxy 1104.

At some point, proxy 1104 may determine that the data flow no longer needs to be inspected by proxy 1104. This scenario is illustrated in FIG. 11B. Proxy 1104 may provide one or more security policies to SDN controller 1106, wherein the one or more security policies comprises information indicating that the data flow is allowed. SDN controller 1106 may reconfigure the control logic such that the control logic can update SDN switch 1108. SDN controller 1106 (i.e., the control logic therein) runs a routing algorithm which updates SDN switch 1108 to provide a second route between client 1110 and server 1112 though a particular one of the one or more SDN switches (e.g., SDN switch 1108) in the SDN environment, wherein the second route bypasses the proxy 1104 and the security appliance 1102.

In some embodiments, SDN controller 1106 transmits Transport Control Protocol (TCP) information for the data flow to SDN switch 1108 in response to receiving the information indicating that the data flow is allowed, wherein the TCP information comprises one or more of the following: TCP Sequence of client flow, TCP Ack of client flow, TCP Sequence of server flow, and TCP Ack of server flow. SDN switch 1108 is configured to calculate an offset based on the TCP information provided by the SDN controller and to add the offset to TCP Sequence and TCP Ack numbers (i.e., rewrites packets) as packets are passed through SDN switch 1108. In some cases, the SDN controller and/or the proxy computes the offset.

In some embodiments, the "TCP Splicing" feature is provided by the SDN switch for the remainder of the data flow or connection. In some embodiments, the "TCP splicing" feature may be used in conjunction with the "limited handoff" feature, such that the SDN switch only functions as the proxy in terminating the data flow for a limited particular number of bytes. Generally, TCP splicing allows the proxy to handoff a flow to an SDN switch. Thus, the SDN switch can apply byte boundaries in order to process the flow for a particular number of bytes, then handoff the flow back to the proxy after the particular number of bytes have been processed at the SDN switch where the SDN switch effectively acts as a proxy in terminating the flow. When byte boundaries are desired, the SDN controller further provides the particular number of bytes where the SDN switch is to serve as the proxy for terminating the flow (e.g., by providing the particular number of bytes when the SDN controller inserts flows to bypass the proxy and hands off the flow to the SDN switch). Furthermore, in addition to rewriting TCP Seq and Ack numbers, the SDN switch is further configured with, e.g., a counter for keeping track of the number of bytes the switch has processed (as measured by one or more corresponding layers of the OSI model for the implementation). Once the particular number of bytes have been processed, the SDN switch halts the TCP Seq and Ack rewriting process and hands the flow back to the proxy.

The following illustrates an example of "TCP Splicing" where the proxy hands off the flow to the SDN switch. The SDN switch terminates the flow and rewrites the TCP Seq and Ack numbers.

| TIME | Client Sends To Server | FLAGS | SEQ | ACK | LEN | Proxy Sends to Client | Proxy Actions |
|---|---|---|---|---|---|---|---|
| 1 | Open Request | SYN | 9278 | N/A | 0 | | |
| 2 | | SYN: ACK | 2598 | 9279 | 0 | Open Received | |
| 3 | Ack Open | ACK | 9279 | 2599 | 0 | | |
| 4 | GET/index.html?Request = 92 HTTP/1.1 Host: www.example.com | ACK | 9279 | 2599 | 53 | | |
| 5 | | | | | | | Connection is allowed; Open Connection |
| 6 | | | | | | | |
| 7 | | | | | | | |
| 8 | | | | | | | |
| 9 | | | | | | | Re-write of GET request; CGI parameter changed |
| 10 | | | | | | | |
| 11 | | ACK | 2599 | 9332 | 1400 | <Picture Data> | |

| | | | | | | |
|---|---|---|---|---|---|---|
| 12 | | | | | | Proxy determines that flow can be TCP spliced "fast pathed" so sends to SDN Controller SEQ & ACK from both connections: SEQ: 9332 SEQ: 5720 ACK: 3999 ACK: 5240Switch now takes over rewritting TCP packets |

| TIME | Proxy Sends to Server | FLAGS | SEQ | ACK | LEN | Server Sends to Client |
|---|---|---|---|---|---|---|
| 1 | | | | | | |
| 2 | | | | | | |
| 3 | | | | | | |
| 4 | | | | | | |
| 5 | | | | | | |
| 6 | Open Request | SYN | 5663 | N/A | 0 | |
| 7 | | SYN: ACK | 3839 | 5664 | 0 | Open Received |
| 8 | Ack Open | ACK | 5664 | 3840 | 0 | |
| 9 | GET/index.html?Request = 10000 HTTP/1.1 Host: www.example.com | ACK | 5664 | 3840 | 56 | |
| 10 | | ACK | 3840 | 5720 | 1400 | <Picture Data> |
| 11 | | | | | | |
| 12 | | | | | | |

| Time | Client Sends To Server | FLAGS | SEQ | ACK | LEN | Switch Actions | FLAGS | SEQ | ACK | LEN | Server Sends to Client |
|---|---|---|---|---|---|---|---|---|---|---|---|
| 13 | | ACK | 3999 | 9332 | 1400 | Calculates following offsets: Client to Server: 9332 − 5720 = 3612 Server to Client: 3999 − 5240 = 429496605 and applies to sequence and ack numbers (in some embodiments, this switch action is performed by the SDN controller and/or the proxy) | ACK | 5240 | 5720 | 1400 | <More Picture Data> |
| 14 | | ACK | 5399 | 9332 | 1400 | | ACK | 6640 | 5720 | 1400 | <More Picture Data> |
| 15 | | ACK | 6799 | 9332 | 1400 | | ACK | 8040 | 5720 | 1400 | <More Picture Data> |
| 16 | Ack of Data | ACK | 9332 | 8199 | 0 | | ACK | 5720 | 9440 | 0 | |

System Illustrations

Figure 12:
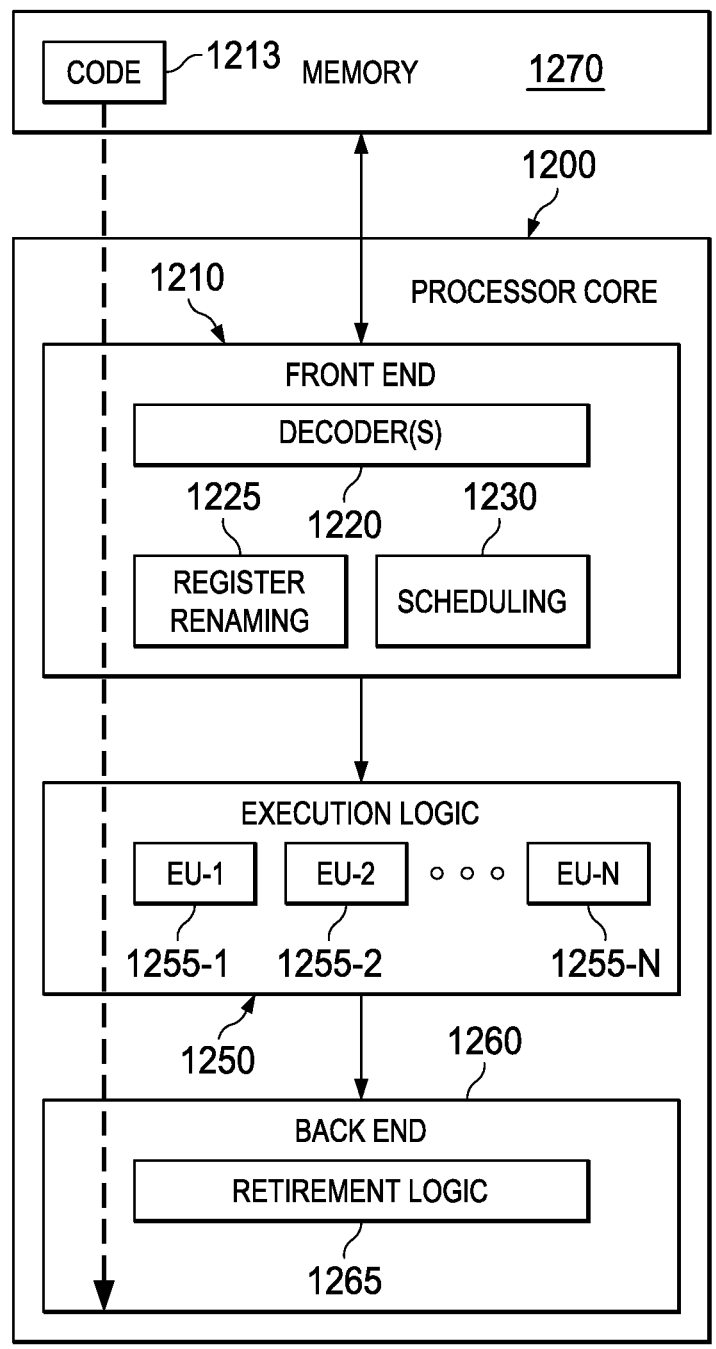
FIG. 12 is a block diagram of a memory coupled to an example processor according to an embodiment.
Figure 13:
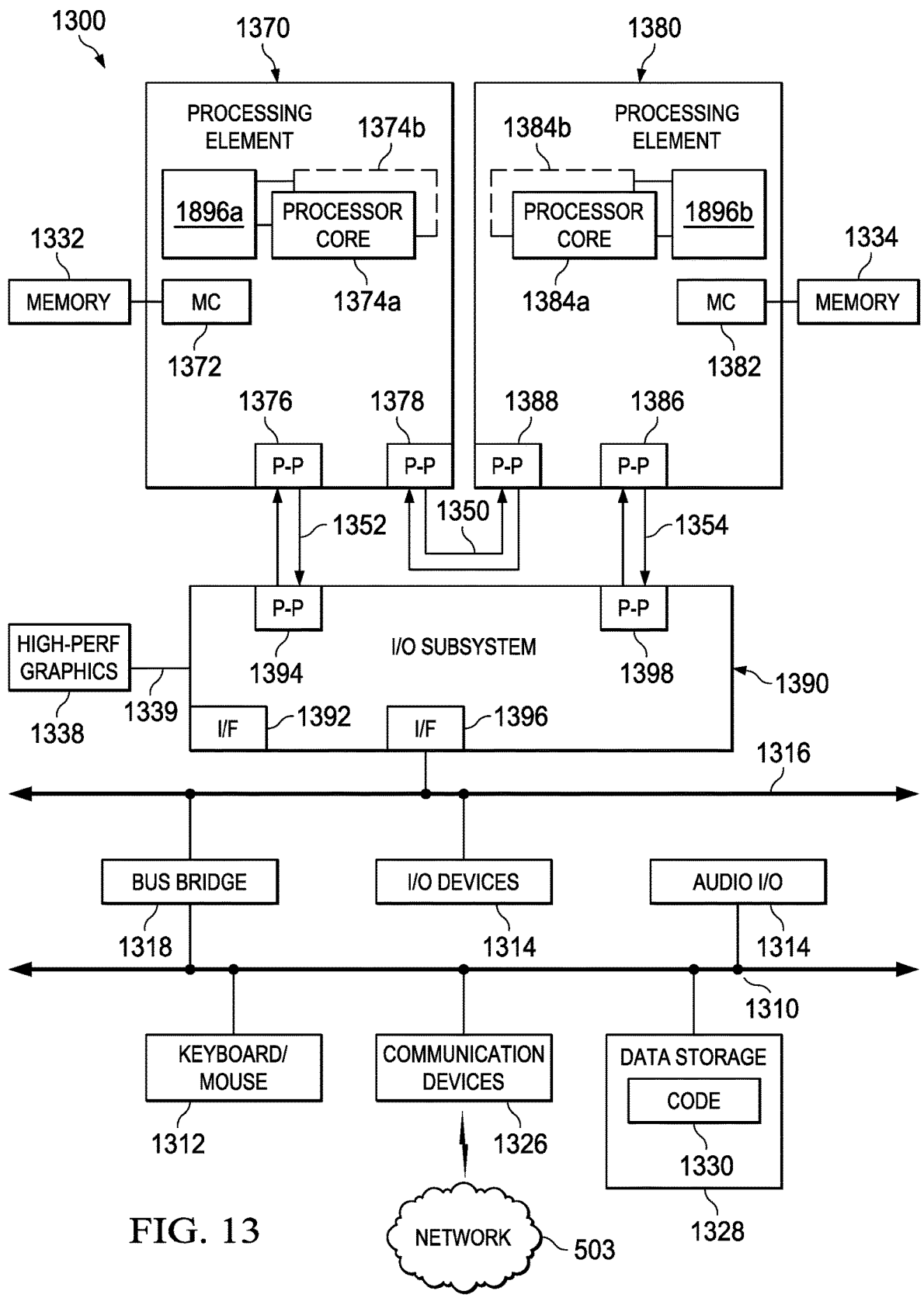
FIG. 13 is a block diagram of an example computing system that is arranged in a point-to-point (PtP) configuration according to an embodiment.

FIG. 12 is a block diagram of a memory coupled to an example processor according to an embodiment. FIG. 12 illustrates a processor core 1200 according to one embodiment. Processor core 1200 may be the core for any type of processor, such as a micro-processor, an embedded processor, a digital signal processor (DSP), a network processor, or other device to execute code. Although only one processor core 1200 is illustrated in FIG. 12, a processing element may alternatively include more than one of the processor core 1200 illustrated in FIG. 12. (See, e.g., multi-core embodiments in FIG. 13, below). Processor 1200 may be any type of processor, such as a microprocessor, an embedded processor, a digital signal processor (DSP), a network processor, a multi-core processor, a single core processor, or other device to execute code. Processor core 1200 may be a single-threaded core or, for at least one embodiment, the processor core 1200 may be multithreaded in that it may include more than one hardware thread context (or "logical processor") per core. Such cores 1200 may be configured to execute instruction code in a manner disclosed herein. This system shown in FIG. 12 may be used to carry out the functions describe herein to be performed by SDN controllers, SDN switches, security appliances, and end points of the network such as Alice and Bob.

FIG. 12 also illustrates a memory 1270 coupled to the processor 1200. The memory 1270 may be any of a wide variety of memories (including various layers of memory hierarchy) as are known or otherwise available to those of skill in the art. The memory 1270 may include one or more code instruction(s) 1213 to be executed by the processor 1200 core. The processor core 1200 follows a program sequence of instructions indicated by the code 1213. Each instruction enters a front end portion 1210 and is processed by one or more decoders 1220. The decoder may generate as its output a micro operation such as a fixed width micro operation in a predefined format, or may generate other instructions, microinstructions, or control signals which reflect the original code instruction. The front end 1210 also includes register renaming logic 1225 and scheduling logic 1230, which generally allocate resources and queue the operation corresponding to the convert instruction for execution.

The processor 1200 is shown including execution logic 1250 having a set of execution units 1255-1 through 1255-N. Some embodiments may include a number of execution units dedicated to specific functions or sets of functions. Other embodiments may include only one execution unit or one execution unit that can perform a particular function. The execution logic 1250 performs the operations specified by code instructions.

After completion of execution of the operations specified by the code instructions, back end logic 1260 retires the instructions of the code 1213. In one embodiment, the processor 1200 allows out of order execution but requires in order retirement of instructions. Retirement logic 1265 may take a variety of forms as known to those of skill in the art (e.g., re-order buffers or the like). In this manner, the processor core 1200 is transformed during execution of the code 1213, at least in terms of the output generated by the decoder, the hardware registers and tables utilized by the register renaming logic 1225, and any registers (not shown) modified by the execution logic 1250.

Although not illustrated in FIG. 12, a processing element may include other elements on chip with the processor core 1200. For example, a processing element may include memory control logic (see, e.g., MC 1372 of FIG. 13, below) along with the processor core 1200. The processing element may include I/O control logic and/or may include I/O control logic integrated with memory control logic. The processing element may also include one or more caches.

FIG. 13 is a block diagram of an example computing system that is arranged in a point-to-point (PtP) configuration according to an embodiment. Shown in FIG. 13 is a multiprocessor system 1300 that includes a first processing element 1370 and a second processing element 1380. While two processing elements 1370 and 1380 are shown, it is to be understood that an embodiment of system 1300 may also include only one such processing element. This system shown in FIG. 13 may be used to carry out the functions describe herein to be performed by SDN controllers, SDN switches, security appliances, and end points of the network such as Alice and Bob.

System 1300 is illustrated as a point-to-point interconnect system, wherein the first processing element 1370 and second processing element 1380 are coupled via a point-to-point interconnect 1350. It should be understood that any or all of the interconnects illustrated in FIG. 13 may be implemented as multi-drop bus rather than point-to-point interconnect.

As shown in FIG. 13, each of processing elements 1370 and 1380 may be multicore processors, including first and second processor cores (i.e., processor cores 1374a and 1374b and processor cores 1384a and 1384b). Such cores 1374, 1374b, 1384a, 1384b may be configured to execute instruction code in a manner disclosed herein.

Each processing element 1370, 1380 may include at least one shared cache 1896. The shared cache 1896a, 1896b may store data (e.g., instructions) that are utilized by one or more components of the processor, such as the cores 1374a, 1374b and 1384a, 1384b, respectively. For example, the shared cache may locally cache data stored in a memory 1332, 1334 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof While shown with only two processing elements 1370, 1380, it is to be understood that the scope of the present invention is not so limited. In other embodiments, one or more additional processing elements may be present in a given processor. Alternatively, one or more of processing elements 1370, 1380 may be an element other than a processor, such as an ASIC chip or a field programmable gate array. For example, additional processing element(s) may include additional processors(s) that are the same as a first processor 1370, additional processor(s) that are heterogeneous or asymmetric to processor a first processor 1370, accelerators (such as, e.g., graphics accelerators or digital signal processing (DSP) units), field programmable gate arrays, or any other processing element. There can be a variety of differences between the processing elements 1370, 1380 in terms of a spectrum of metrics of merit including architectural, microarchitectural, thermal, power consumption characteristics, and the like. These differences may effectively manifest themselves as asymmetry and heterogeneity amongst the processing elements 1370, 1380. For at least one embodiment, the various processing elements 1370, 1380 may reside in the same die package.

First processing element 1370 may further include memory controller logic (MC) 1372 and point-to-point (P-P) interfaces 1376 and 1378. Similarly, second processing element 1380 may include a MC 1382 and P-P interfaces 1386 and 1388. As shown in FIG. 13, MC's 1372 and 1382 couple the processors to respective memories, namely a memory 1332 and a memory 1334, which may be portions of main memory locally attached to the respective processors. While MC logic 1372 and 1382 is illustrated as integrated into the processing elements 1370, 1380, for alternative embodiments the MC logic may be discrete logic outside the processing elements 1370, 1380 rather than integrated therein.

First processing element 1370 and second processing element 1380 may be coupled to an I/O subsystem 1390 via P-P interconnects 1376, 1386 and 1384, respectively. As shown in FIG. 13, I/O subsystem 1390 includes P-P interfaces 1394 and 1398. Furthermore, I/O subsystem 1390 includes an interface 1392 to couple I/O subsystem 1390 with a high performance graphics engine 1338. In one embodiment, bus 1349 may be used to couple graphics engine 1338 to I/O subsystem 1390. Alternately, a point-to-point interconnect 1339 may couple these components.

In turn, I/O subsystem 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 may be coupled to first bus 1316, along with a bus bridge 1318 which may couple first bus 1316 to a second bus 1310. In one embodiment, second bus 1320 may be a low pin count (LPC) bus. Various devices may be coupled to second bus 1320 including, for example, a keyboard/mouse 1312, communication device(s) 1326 (which may in turn be in communication with the computer network 503), and a data storage unit 1328 such as a disk drive or other mass storage device which may include code 1330, in one embodiment. The code 1330 may include instructions for performing embodiments of one or more of the methods described above. Further, an audio I/O 1324 may be coupled to second bus 1320.

Note that other embodiments are contemplated. For example, instead of the point-to-point architecture of FIG. 13, a system may implement a multi-drop bus or another such communication topology. Also, the elements of FIG. 13 may alternatively be partitioned using more or fewer integrated chips than shown in FIG. 13.

Note that with the examples provided herein, interaction may be described in terms of two, three, or more computing devices. However, this has been done for purposes of clarity and example only. In certain cases, it may be easier to describe one or more of the functionalities of a given set of flows by only referencing a limited number of computing devices. Moreover, the network security system is readily scalable and can be implemented across a large number of components, as well as more complicated/sophisticated arrangements and configurations. Accordingly, the examples provided should not limit the scope or inhibit the broad teachings of the network security system as potentially applied to a myriad of other architectures.

It is also important to note that the operations described with reference to FIG. 2 or other figures, illustrate only some of the possible network security functions that may be executed by, or within, systems illustrated in FIGS. 1, 3A-B, 4, 6A-D, 7, 8A-B, 9, 10, 11A-B, 12 and 13. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Additionally, although systems in FIGS. 1, 3A-B, 4, 6A-D, 7, 8A-B, 9, 10, 11A-B, 12 and 13 have been illustrated with reference to particular elements and operations that facilitate the network security functions, these elements and operations may be replaced by any suitable architecture, protocols, and/or processes that achieve the intended functionality of the network security system.

In one example implementation, various devices or components involved in implementing the embodiments described herein can include software for achieving the described functions, and these devices or components disclosed herein may comprise software embodied in one or more non-transitory, tangible media for facilitating the activities described herein. At least a part of the systems and devices (e.g., SDN switch, SDN controllers, security appliance, proxy, gateway, etc.) disclosed herein may also include a memory device (or memory element) for storing information to be used in achieving the functions as outlined herein. Additionally, the systems and devices (e.g., SDN switch, SDN controllers, security appliance, proxy, gateway, etc.) described herein may include one or more processors that is capable of executing software or an algorithm to perform the functions as discussed in this Specification. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that in certain example implementations, the functions outlined herein and in any of the figures/drawings included herein may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element is provided to store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include one or more non-transitory, tangible, machine readable media having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "non-transitory machine readable medium" shall accordingly include, but not be limited to, memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

It should be noted that much of the infrastructure discussed herein (e.g., SDN switch, SDN controllers, security appliance, proxy, gateway, etc.) can be provisioned as part of any type of network element. As used herein, the terms "network element", "network device", "network router", "network switch", "SDN switch", "SDN controller", "security appliance", "node", "end node", "point A", "point B", "guest host", "native host", "Alice", "Bob", "leaf node", "root node", "spine node", "switch", etc. can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices (e.g., SDN switch, SDN controllers, security appliance, proxy, gateway, etc.) can include software to achieve (or to foster) the provision of a fast path. This could include the implementation of instances of any of the components, engines, logic, etc. shown in the diagrams included herein. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the figures/drawings included herein (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to a myriad of other architectures.

It is also important to note that the steps in the preceding flow diagrams illustrate only some of the possible signaling scenarios and patterns that may be executed by, or within, communication systems shown in the figures/drawings included herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the figures/drawings in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

In accordance with the well-established principle that an "applicant is entitled to be his or her own lexicographer," MPEP 2111.01(IV), citing *In re Paulson*, 30 F.3d 1475, 1480 (Fed. Cir. 1994), certain terms have been expressly defined herein. It is expressly intended that those terms have the definitions supplied, and that they not be given any interpretation inconsistent with those definitions.

The following examples pertain to some embodiments of the disclosure.

Example 1 is at least one machine readable non-transitory storage medium having instructions stored thereon for providing network security in a software defined network (SDN) environment, wherein the instructions when executed by at least one processor cause the at least one processor to perform the following operations: providing control logic by one or more SDN controllers, wherein routing of network traffic using one or more SDN switches in the SDN environment is controlled by the control logic; receiving one or more security policies for the SDN environment from a security appliance at the one or more SDN controllers, wherein the one or more security policies specify one or more of the following: security zone(s), network access right(s), data access right(s), insertion of a security appliance, and removal of a security appliance; and in response to receiving the one or more security policies, reconfiguring the control logic using the one or more SDN controllers according to the one or more security policies received from the security appliance.

In Example 2, the subject matter of Example 1 can optionally include: providing the control logic comprising configuring a first route between a first node and a second node in the SDN environment for carrying network traffic of a data flow, wherein the first route traverses through the security appliance for scanning the network traffic; the one or more security policies comprises information indicating that the data flow no longer requires scanning by the security appliance; and reconfiguring the control logic for the SDN environment comprises providing, using the one or more SDN controllers, a second route between the first node and the second node, wherein the second route bypasses the security appliance.

In Example 3, the subject matter of Example 2 can optionally include the second route being better than the first route according to one or more metrics.

In Example 4, the subject matter of Example 4 can optionally include: the one or more security policies comprising information indicating that a data flow between a first node and a second node requires scanning by a security appliance; and reconfiguring the control logic for the SDN environment comprising providing, using the SDN controller, a route between the first node and the second node, wherein the route traverses through the security appliance for added security in response to receiving the one or more security policies.

In Example 5, the subject matter of any one of the Examples 1-4 can optionally include the security appliance being configured to scan packet(s) in the data flow at one or more of the following layers: (1) physical layer, (2) data link layer, (3) network layer, (4) transport layer, (5) session layer, (6) presentation layer, and (7) application layer.

In Example 6, the subject matter of any one of the Examples 1-5 can optionally include the control logic by the one or more SDN controllers comprising logic for determining one or more flow table entries for configuring flow table(s) of the one or more SDN switches.

In Example 7, the subject matter of any one of the Examples 1-6 can optionally include: the security appliance being integrated with the one or more SDN controllers; and the SDN controller being integrated with or communicably connected to the one or more SDN switches.

In Example 8, the subject matter of any one of the Examples 1-6 can optionally include: the security appliance being communicably connected to the one or more SDN controllers remote from the security appliance; and the one or more SDN controllers being integrated with or communicably connected to the one or more SDN switches.

In Example 9, the subject matter of any one of the Examples 1-8 can optionally include at least one of the one or more SDN switches being configured to rewrite one or more fields of packets of the network traffic to indicate to the security appliance the switch port or security zone the packet was originally received and/or to direct the packets to bypass the security appliance.

In Example 10, the subject matter of any one of the Examples 1-3, and 5-9 can optionally include: providing the control logic comprising configuring a first route between a client and a server in the SDN environment for carrying network traffic of a data flow between the client and the server, wherein the first route traverses through the security appliance, and the security appliance comprises a proxy that terminates the data flow; the one or more security policies comprising information indicating that the data flow is allowed and/or the data flow no longer needs to traverse through the proxy; and reconfiguring the control logic for the SDN environment comprises providing, using the one or more SDN controller, a second route between the client and the server though a particular one of the one or more SDN switches in the SDN environment, wherein the second route bypasses the proxy.

In Example 11, the subject matter of any one of the Examples 1-3 and 5-10 can optionally include transmitting, by the one or more SDN controllers to the particular one of the one or more SDN switches, Transport Control Protocol (TCP) information for the data flow in response to receiving the information indicating that the data flow is allowed, wherein the TCP information comprises one or more of the following: (a) TCP Sequence of client flow; (b) TCP Ack of client flow; (c) TCP Sequence of server flow; and (d) TCP Ack of server flow.

In Example 12, the subject matter of Example 11 can optionally include the particular one of the one or more SDN switches being configured to calculate an offset based on the TCP information provided by the one or more SDN controllers and to add the offset to TCP Sequence and TCP Ack numbers as packets are passed through the particular one of the one or more SDN switches.

In Example 13, the subject matter of any one of the Examples 1-12 can optionally include: the one or more security policies for the SDN environment from the security appliance indicating a particular amount of network data can bypass the security appliance or the particular amount of network traffic must traverse the security appliance; the particular amount of network data being measurable by a particular number of units of data, a particular number of bytes, or a particular number of protocol data units as measured at any one of the Open Systems Interconnection layers; and one or more SDN switches in the SDN environment being configured to (1) after the particular amount of network traffic has bypassed the security appliance, route subsequent network traffic through the security appliance, or (2) after routing the particular amount of network traffic through the security appliance, route the subsequent network traffic such that the security appliance is bypassed.

In Example 14, the subject matter of any one of the Examples 1-13 can optionally include providing the control logic comprises configuring security zones in the SDN environment for carrying network traffic, wherein the security zones provide different levels of security for network and data access; the one or more security policies comprising information which adds, removes, and/or modifies the security zones; and reconfiguring the control logic for the SDN environment comprises reconfiguring, using the one or more SDN controllers, the security zones according to the one or more security policies.

In Example 15, the subject matter of any one of the Examples 1-14 can optionally include: the one or more security policies comprising information indicating that a host belongs to a particular security zone; and reconfiguring the control logic for the SDN environment comprises (1) adding, using the one or more SDN controllers, the particular security zone to the SDN environment, and/or (2) adding, using the one or more SDN controllers, the host to the particular security zone, in response to receiving the one or more security policies.

Example 16 is at least one machine readable non-transitory storage medium having instructions stored thereon for providing network security in a software defined network (SDN) environment, wherein the instructions when executed by at least one processor cause the at least one processor to perform the following operations: receiving one or more flow table entries for one or more flow tables for routing or switching network traffic at a SDN switch from one or more SDN controllers, wherein the one or more SDN controllers are configured with control logic which controls routing of network traffic through one or more SDN switches in the SDN environment using the one or more flow table entries, wherein the control logic is configured to implement one or more security policies for the SDN environment provided by a security appliance to the one or more SDN controllers, and wherein the one or more security policies specify one or more of the following: security zone(s), network access right(s), data access right(s), insertion of a security appliance, and removal of a security appliance; and in response to receiving the one or more flow table entries, reconfiguring the one or more flow tables according to the flow entries received from the SDN controller in accordance with the one or more security policies.

In Example 17, the subject matter of Example 16 can optionally include rewriting one or more fields of packets of the network traffic to indicate to the security appliance the switch port or security zone the packet was originally received and/or to direct the packets to bypass the security appliance according to the one or more flow tables.

In Example 18, the subject matter of Examples 16 or 17 can optionally include receiving, from the one or more SDN controllers at the SDN switch, Transport Control Protocol (TCP) information for the data flow in response to receiving the information indicating that the data flow is allowed, wherein the TCP information comprises one or more of the following (a) TCP Sequence of client flow; (b) TCP Ack of client flow; (c) TCP Sequence of server flow; and (d) TCP Ack of server flow.

In Example 19, the subject matter of any one of the Examples 16-18 can optionally include calculating an offset based on the TCP information provided by the one or more SDN controllers and to add the offset to TCP Sequence and TCP Ack numbers as packets are passed through the particular one of the one or more SDN switches.

In Example 20, the subject matter of any one of the Examples 16-19 can optionally include the one or more security policies for the SDN environment from the security appliance indicating network traffic for a particular number of bytes of network traffic can bypass the security appliance or the particular number of bytes of network traffic must traverse the security appliance; and the operations further comprising: (1) receiving from the SDN controller one or more flow entries conditioned on the particular number of bytes of network traffic or a number of units of data as measured at any one of the Open Systems Interconnection layers and (2) routing network traffic, after the particular number of bytes of network traffic has bypassed the security appliance, back to the security appliance.

Example 21 is an apparatus for providing network security in a software defined network (SDN) environment, the apparatus comprising: at least one memory element; at least one processor coupled to the at least one memory element; one or more SDN controllers that when executed by the at least one processor is configured to: provide control logic by one or more SDN controllers, wherein routing of network traffic using one or more SDN switches in the SDN environment is controlled by the control logic; receive one or more security policies for the SDN environment from a security appliance at the one or more SDN controllers, wherein the one or more security policies specify one or more of the following: security zone(s), network access right(s), data access right(s), insertion of a security appliance, and removal of a security appliance; and in response to receiving the one or more security policies, reconfigure the control logic using the one or more SDN controllers according to the one or more security policies received from the security appliance.

In Example 22, the subject matter of Example 21 can optionally include the one or more SDN controllers being further configured to: configure a first route between a first node and a second node in the SDN environment for carrying network traffic of a data flow, wherein the first route traverses through the security appliance for scanning the network traffic; wherein the one or more security policies comprises information indicating that the data flow no longer requires scanning by the security appliance; and provide, using the one or more SDN controllers, a second route between the first node and the second node, wherein the second route bypasses the security appliance.

In Example 23, the subject matter of Example 22 can optionally include the second route being better than the first route according to one or more metrics.

In Example 24, the subject matter of Example 21 can optionally include the one or more security policies comprising information indicating that a data flow between a first node and a second node requires scanning by a security appliance; and the one or more SDN controllers being further configured to provide, using the SDN controller, a route between the first node and the second node, wherein the route traverses through the security appliance for added security in response to receiving the one or more security policies.

In Example 25, the subject matter of any one of the Examples 21-24 can optionally include the security appliance being configured to inspect packet(s) in the data flow at one or more of the following layers: (1) physical layer, (2) data link layer, (3) network layer, (4) transport layer, (5) session layer, (6) presentation layer, and (7) application layer.

In Example 26, the subject matter of Examples any one of the 21-25 can optionally include the control logic by the one or more SDN controllers comprising logic for determining one or more flow table entries for configuring flow table(s) of the one or more SDN switches.

In Example 27, the subject matter of any one of the Examples 21-26 can optionally include: the security appliance is integrated with the one or more SDN controllers; and the SDN controller is integrated with or communicably connected to the one or more SDN switches.

In Example 28, the subject matter of any one of the Examples 21-26 can optionally include: the security appliance is communicably connected to the one or more SDN controllers remote from the security appliance; and the one or more SDN controllers is integrated with or communicably connected to the one or more SDN switches.

In Example 29, the subject matter of any one of the Examples 21-28 can optionally include at least one of the one or more SDN switches being configured to rewrite one or more fields of packets of the network traffic to indicate to the security appliance the switch port or security zone the packet was originally received and/or to direct the packets to bypass the security appliance.

In Example 30, the subject matter of any one of the Examples 21-23, and 25-29 can optionally include the one or more SDN controllers being further configured to: configure a first route between a client and a server in the SDN environment for carrying network traffic of a data flow between the client and the server, wherein the first route traverses through the security appliance, and the security appliance comprises a proxy that terminates the data flow; wherein the one or more security policies comprises information indicating that the data flow is allowed and/or the data flow no longer needs to traverse through the proxy; and provide, using the one or more SDN controller, a second route between the client and the server though a particular one of the one or more SDN switches in the SDN environment, wherein the second route bypasses the proxy.

In Example 31, the subject matter of any one of the Examples 21-23 and 25-30 can optionally include the one or more SDN controllers being further configured to: transmit, by the one or more SDN controllers to the particular one of the one or more SDN switches, Transport Control Protocol (TCP) information for the data flow in response to receiving the information indicating that the data flow is allowed, wherein the TCP information comprises one or more of the following: (a) TCP Sequence of client flow; (b) TCP Ack of client flow; (c) TCP Sequence of server flow; and (d) TCP Ack of server flow.

In Example 32, the subject matter of Example 31 can optionally include the particular one of the one or more SDN switches being configured to calculate an offset based on the TCP information provided by the one or more SDN controllers and to add the offset to TCP Sequence and TCP Ack numbers as packets are passed through the particular one of the one or more SDN switches.

In Example 33, the subject matter of any one of the Examples 21-32 can optionally include the one or more security policies for the SDN environment from the security appliance indicating a particular amount of network data can bypass the security appliance or the particular amount of network traffic must traverse the security appliance; the particular amount of network data being measurable by a particular number of units of data, a particular number of bytes, or a particular number of protocol data units as measured at any one of the Open Systems Interconnection layers; and one or more SDN switches in the SDN environment being configured to (1) after the particular amount of network traffic has bypassed the security appliance, route subsequent network traffic through the security appliance, or (2) after routing the particular amount of network traffic through the security appliance, route the subsequent network traffic such that the security appliance is bypassed.

In Example 34, the subject matter of any one of the Examples 21-33 can optionally include the one or more SDN controllers being further configured to: configure security zones in the SDN environment for carrying network traffic, wherein the security zones provide different levels of security for network and data access; the one or more security policies comprises information which adds, removes, and/or modifies the security zones; and reconfigure, using the one or more SDN controllers, the security zones according to the one or more security policies.

In Example 35, the subject matter of any one of the Examples 21-34 can optionally include: the one or more security policies comprising information indicating that a host belongs to a particular security zone; and the one or more SDN controllers being further configured to (1) add, using the one or more SDN controllers, the particular security zone to the SDN environment, and/or (2) add, using the one or more SDN controllers, the host to the particular security zone, in response to receiving the one or more security policies.

Example 36 is an apparatus for providing network security in a software defined network (SDN) environment, the apparatus comprising: at least one memory element; at least one processor coupled to the at least one memory element; and a SDN switching module that when executed by the at least one processor is configured to: receive one or more flow table entries for one or more flow tables for routing or switching network traffic at a SDN switch from one or more SDN controllers, wherein the one or more SDN controllers are configured with control logic which controls routing of network traffic through one or more SDN switches in the SDN environment using the one or more flow table entries, wherein the control logic is configured to implement one or more security policies for the SDN environment provided by a security appliance to the one or more SDN controllers, and wherein the one or more security policies specify one or more of the following: security zone(s), network access right(s), data access right(s), insertion of a security appliance, and removal of a security appliance; and in response to receiving the one or more flow table entries, reconfigure the one or more flow tables according to the flow entries received from the SDN controller in accordance with the one or more security policies.

In Example 37, the subject matter of Example 36 can optionally include SDN switching module being further configured to rewrite one or more fields of packets of the network traffic to indicate to the security appliance the switch port or security zone the packet was originally received and/or to direct the packets to bypass the security appliance according to the one or more flow tables.

In Example 38, the subject matter of Example 36 or 37 can optionally include the SDN switching module being further configured to: receive, from the one or more SDN controllers at the SDN switch, Transport Control Protocol (TCP) information for the data flow in response to receiving the information indicating that the data flow is allowed, wherein the TCP information comprises one or more of the following: (a) TCP Sequence of client flow; (a) TCP Ack of client flow; (b) TCP Sequence of server flow; and (c) TCP Ack of server flow.

In Example 39, the subject matter of any one of the Examples 36-38 can optionally include the SDN switching module being further configured to: calculate an offset based on the TCP information provided by the one or more SDN controllers and to add the offset to TCP Sequence and TCP Ack numbers as packets are passed through the particular one of the one or more SDN switches.

In Example 40, the subject matter of any one of the Examples 36-39 can optionally include: the one or more security policies for the SDN environment from the security appliance indicating network traffic for a particular number of bytes of network traffic can bypass the security appliance or the particular number of bytes of network traffic must traverse the security appliance; wherein the SDN switching module is further configured to receive from the SDN controller one or more flow entries conditioned on the particular number of bytes of network traffic or a number of units of data as measured at any one of the Open Systems Interconnection layers; and routing network traffic, after the particular number of bytes of network traffic has bypassed the security appliance, back to the security appliance.

Example 41 is a method for providing network security in a software defined network (SDN) environment, the method comprising: providing control logic by one or more SDN controllers, wherein routing of network traffic using one or more SDN switches in the SDN environment is controlled by the control logic; receiving one or more security policies for the SDN environment from a security appliance at the one or more SDN controllers, wherein the one or more security policies specify one or more of the following: security zone(s), network access right(s), data access right(s), insertion of a security appliance, and removal of a security appliance; in response to receiving the one or more security policies, reconfiguring the control logic using the one or more SDN controllers according to the one or more security policies received from the security appliance; and providing one or more flow entries to the one or more SDN switches using the reconfigured control logic.

In Example 42, the subject matter of Example 41 can optionally include: providing the control logic comprising configuring a first route between a first node and a second node in the SDN environment for carrying network traffic of a data flow, wherein the first route traverses through the security appliance for scanning the network traffic; the one or more security policies comprising information indicating that the data flow no longer requires scanning by the security appliance; and reconfiguring the control logic for the SDN environment comprising providing, using the one or more SDN controllers, a second route between the first node and the second node, wherein the second route bypasses the security appliance.

In Example 43, the subject matter of Example 42 can optionally include the second route being better than the first route according to one or more metrics.

In Example 44, the subject matter of Example 41 can optionally include: the one or more security policies comprises information indicating that a data flow between a first node and a second node requires scanning by a security appliance; and reconfiguring the control logic for the SDN environment comprises providing, using the SDN controller, a route between the first node and the second node, wherein the route traverses through the security appliance for added security in response to receiving the one or more security policies.

In Example 45, the subject matter of any one of the Examples 41-44 can optionally include the security appliance being configured to packet(s) in the data flow at one or more of the following layers: (1) physical layer, (2) data link layer, (3) network layer, (4) transport layer, (5) session layer, (6) presentation layer, and (7) application layer.

In Example 46, the subject matter of any one of Examples 41-45 can optionally include the control logic by the one or more SDN controllers comprising logic for determining one or more flow table entries for configuring flow table(s) of the one or more SDN switches.

In Example 47, the subject matter of any one of Examples 41-46 can optionally include: the security appliance being integrated with the one or more SDN controllers; and the SDN controller is integrated with or communicably connected to the one or more SDN switches.

In Example 48, the subject matter of any one of Examples 41-46 can optionally include the security appliance being communicably connected to the one or more SDN controllers remote from the security appliance; and the one or more SDN controllers is integrated with or communicably connected to the one or more SDN switches.

In Example 49, the subject matter of any one of Examples 41-48 can optionally include at least one of the one or more SDN switches being configured to rewrite one or more fields of packets of the network traffic to indicate to the security appliance the switch port or security zone the packet was originally received and/or to direct the packets to bypass the security appliance.

In Example 50, the subject matter of any one of Examples 41-43, and 45-49 can optionally include: providing the control logic comprises configuring a first route between a client and a server in the SDN environment for carrying network traffic of a data flow between the client and the server, wherein the first route traverses through the security appliance, and the security appliance comprises a proxy that terminates the data flow; the one or more security policies comprising information indicating that the data flow is allowed and/or the data flow no longer needs to traverse through the proxy; and reconfiguring the control logic for the SDN environment comprising providing, using the one or more SDN controller, a second route between the client and the server though a particular one of the one or more SDN switches in the SDN environment, wherein the second route bypasses the proxy.

In Example 51, the subject matter of any one of 41-43 and 45-50 can optionally include transmitting, by the one or more SDN controllers to the particular one of the one or more SDN switches, Transport Control Protocol (TCP) information for the data flow in response to receiving the information indicating that the data flow is allowed, wherein the TCP information comprises one or more of the following: (a) TCP Sequence of client flow; (a) TCP Ack of client flow; (c) TCP Sequence of server flow; and (d) TCP Ack of server flow.

In Example 52, the subject matter of Example 51 can optionally include the particular one of the one or more SDN switches, is configured to calculate an offset based on the TCP information provided by the one or more SDN controllers and to add the offset to TCP Sequence and TCP Ack numbers as packets are passed through the particular one of the one or more SDN switches.

In Example 53, the subject matter of any one of the Examples 41-52 can optionally include: the one or more security policies for the SDN environment from the security appliance indicating a particular amount of network data can bypass the security appliance or the particular amount of network traffic must traverse the security appliance; the particular amount of network data being measurable by a particular number of units of data, a particular number of bytes, or a particular number of protocol data units as measured at any one of the Open Systems Interconnection layers; and one or more SDN switches in the SDN environment being configured to (1) after the particular amount of network traffic has bypassed the security appliance, route subsequent network traffic through the security appliance, or (2) after routing the particular amount of network traffic through the security appliance, route the subsequent network traffic such that the security appliance is bypassed.

In Example 54, the subject matter of any one of the Examples 41-53 can optionally include: providing the control logic comprising configuring security zones in the SDN environment for carrying network traffic, wherein the security zones provide different levels of security for network and data access; the one or more security policies comprising information which adds, removes, and/or modifies the security zones; and reconfiguring the control logic for the SDN environment comprising reconfiguring, using the one or more SDN controllers, the security zones according to the one or more security policies.

In Example 55, the subject matter of any one of the Examples 41-54 can optionally include the one or more security policies comprising information indicating that a host belongs to a particular security zone; and reconfiguring the control logic for the SDN environment comprising (1) adding, using the one or more SDN controllers, the particular security zone to the SDN environment, and/or (2) adding, using the one or more SDN controllers, the host to the particular security zone, in response to receiving the one or more security policies.

Example 56 is a method for providing network security in a software defined network (SDN) environment, the method comprising: receiving one or more flow table entries for one or more flow tables for routing or switching network traffic at a SDN switch from one or more SDN controllers, wherein the one or more SDN controllers are configured with control logic which controls routing of network traffic through one or more SDN switches in the SDN environment using the one or more flow table entries, wherein the control logic is configured to implement one or more security policies for the SDN environment provided by a security appliance to the one or more SDN controllers, and wherein the one or more security policies specify one or more of the following: security zone(s), network access right(s), data access right(s), insertion of a security appliance, and removal of a security appliance; and in response to receiving the one or more flow table entries, reconfiguring the one or more flow tables according to the flow entries received from the SDN controller in accordance with the one or more security policies.

In Example 57, the subject matter of Example 56 can optionally include rewriting one or more fields of packets of the network traffic to indicate to the security appliance the switch port or security zone the packet was originally received and/or to direct the packets to bypass the security appliance according to the one or more flow tables.

In Example 58, the subject matter of Example 56 or 57 can optionally include receiving, from the one or more SDN controllers at the SDN switch, Transport Control Protocol (TCP) information for the data flow in response to receiving the information indicating that the data flow is allowed, wherein the TCP information comprises one or more of the following: (a) TCP Sequence of client flow; (b) TCP Ack of client flow; (c) TCP Sequence of server flow; and (d) TCP Ack of server flow.

In Example 59, the subject matter of any one of Examples 16-18 can optionally include calculating an offset based on the TCP information provided by the one or more SDN controllers and to add the offset to TCP Sequence and TCP Ack numbers as packets are passed through the particular one of the one or more SDN switches.

In Example 60, the subject matter of any one of the Examples 56-59 can optionally include: the one or more security policies for the SDN environment from the security appliance indicating network traffic for a particular number of bytes of network traffic can bypass the security appliance or the particular number of bytes of network traffic must traverse the security appliance; and receiving from the SDN controller one or more flow entries conditioned on the particular number of bytes of network traffic or a number of units of data as measured at any one of the Open Systems Interconnection layers; and routing network traffic, after the particular number of bytes of network traffic has bypassed the security appliance, back to the security appliance.

Example 61 is an apparatus for providing network security in a software defined network (SDN) environment, the apparatus comprising: means for providing control logic by one or more SDN controllers, wherein routing of network traffic using one or more SDN switches in the SDN environment is controlled by the control logic; means for receiving one or more security policies for the SDN environment from a security appliance at the one or more SDN controllers, wherein the one or more security policies specify one or more of the following: security zone(s), network access right(s), data access right(s), insertion of a security appliance, and removal of a security appliance; in response to receiving the one or more security policies, reconfiguring the control logic using the one or more SDN controllers according to the one or more security policies received from the security appliance; and means for providing one or more flow entries to the one or more SDN switches using the reconfigured control logic.

Example 62 is an apparatus for providing network security in a software defined network (SDN) environment, the method comprising: means for receiving one or more flow table entries for one or more flow tables for routing or switching network traffic at a SDN switch from one or more SDN controllers, wherein the one or more SDN controllers are configured with control logic which controls routing of network traffic through one or more SDN switches in the SDN environment using the one or more flow table entries, wherein the control logic is configured to implement one or more security policies for the SDN environment provided by a security appliance to the one or more SDN controllers, and wherein the one or more security policies specify one or more of the following: security zone(s), network access right(s), data access right(s), insertion of a security appliance, and removal of a security appliance; and, means for reconfiguring the one or more flow tables according to the flow entries received from the SDN controller in accordance with the one or more security policies in response to receiving the one or more flow table entries.

Example 63 is an apparatus for providing network security in a software defined network (SDN) environment, the apparatus comprising means for performing the method in any one of Examples 41-60.

In Example 64, the subject matter of Example 63 can optionally include the means for performing the method comprising at least one processor and at least one memory element.

In Example 65, the subject matter of Example 64 can optionally include the at least one memory element comprising machine readable instructions that when executed, cause the apparatus to perform the method in any one of the Examples 41-60.

In Example 66, the subject matter of any one of the Examples 63-65 can optionally include that the apparatus being a computing device.

Example 67 is at least one machine readable storage medium comprising instructions for providing network security in a software defined network (SDN) environment, wherein the instructions when executed implement a method or realize an apparatus in any one of the Examples 21-60.

What is claimed is:

1. At least one machine-readable, non-transitory storage medium having instructions stored thereon for providing network security in a software defined network (SDN) environment, wherein the instructions, when executed by at least one processor of an SDN controller, cause the at least one processor to perform operations comprising:
configuring a first route between a first node and a second node in the SDN environment for carrying network traffic of a data flow between the first node and the second node;
receiving one or more security policies for the SDN environment from a security appliance, wherein the one or more security policies specify one or more of the following: security zone(s), network access right(s), data access right(s), insertion of the security appliance, or removal of the security appliance, the one or more security policies indicate a number of units of data, and the first route bypasses or traverses through the security appliance;
determining one or more flow table entries for configuring one or more flow table(s) of one or more SDN switches, according to the number of units of data indicated by the one or more security policies;
providing the one or more flow table entries to update the one or more flow table(s) of the one or more SDN switches to provide a second route between the first node and the second node, wherein the second route traverses through or bypasses the security appliance, based on the one or more security policies indicating the data flow can bypass or travel through the security appliance; and
transmitting, to one of the one or more SDN switches, Transport Control Protocol (TCP) information for the data flow, wherein the TCP information comprises one or more of the following:

(a) a TCP Sequence number of a client flow;
(b) a TCP Acknowledgment number of the client flow;
(c) a TCP Sequence number of a server flow; or
(d) a TCP Acknowledgment number of the server flow, and an offset is calculated based on the TCP Sequence number, the TCP Acknowledgment number, the TCP Sequence number, or the TCP Acknowledgment number.

2. The at least one machine-readable storage medium of claim 1, wherein
the first route traverses through the security appliance;
the one or more security policies indicate the data flow can bypass the security appliance; and
the second route bypasses the security appliance.

3. The at least one machine-readable storage medium of claim 1, wherein
the first route bypasses the security appliance;
the one or more security policies indicate the data flow is to be scanned by the security appliance; and
the second route traverses through the security appliance.

4. The at least one machine-readable storage medium of claim 1, wherein the security appliance is integrated with the SDN controller.

5. The at least one machine-readable storage medium of claim 1, wherein the SDN controller is remote from the security appliance.

6. The at least one machine-readable storage medium of claim 1, wherein the operations further comprise:
calculating the offset based on the TCP information; and
transmitting the offset to the one of the one or more SDN switches.

7. An apparatus for providing network security in a software defined network (SDN) environment, the apparatus comprising:
at least one memory element; and
one or more SDN controllers coupled to the at least one memory element, wherein the one or more SDN controllers are configured to
configure a first route between a first node and a second node in the SDN environment for carrying network traffic of a data flow between the first node and the second node;
receive one or more security policies for the SDN environment from a security appliance, wherein the one or more security policies specify one or more of the following: security zone(s), network access right(s), data access right(s), insertion of the security appliance, or removal of the security appliance, and the one or more security policies indicate a number of units of data, and the first route bypasses or traverses through the security appliance;
determine one or more flow table entries for configuring one or more flow table(s) of one or more SDN switches, according to the number of units of data indicated by the one or more security policies;
provide the one or more flow table entries to update the one or more flow table(s) of the one or more SDN switches to provide a second route between the first node and the second node, wherein the second route traverses through or bypasses the security appliance, based on the one or more security policies indicating the data flow can bypass or travel through the security appliance; and
transmit to one of the one or more SDN switches, Transport Control Protocol (TCP) information for the data flow, wherein the TCP information comprises one or more of the following:

(a) a TCP Sequence number of a client flow;
(b) a TCP Acknowledgment number of the client flow;
(c) a TCP Sequence number of a server flow; or
(d) a TCP Acknowledgment number of the server flow, and an offset is calculated based on the TCP Sequence number, the TCP Acknowledgment number, the TCP Sequence number, or the TCP Acknowledgment number.

8. The apparatus of claim 7, wherein
the first route traverses through the security appliance;
the one or more security policies indicate the data flow can bypass the security appliance; and
the second route bypasses the security appliance.

9. The apparatus of claim 7, wherein
the first route bypasses the security appliance;
the one or more security policies indicate the data flow is to be scanned by the security appliance; and
the second route traverses through the security appliance.

10. The apparatus of claim 7, further including:
the security appliance.

11. The apparatus of claim 7, wherein the apparatus is remote from the security appliance.

12. The apparatus of claim 7, wherein the one or more SDN controllers are further configured to
calculate the offset based on the TCP information; and
transmit the offset to the one of the one or more SDN switches.

13. A method for providing network security in a software defined network (SDN) environment, implemented by an SDN controller, the method comprising:
configuring a first route between a first node and a second node in the SDN environment for carrying network traffic of a data flow between the first node and the second node;
receiving one or more security policies for the SDN environment from a security appliance, wherein the one or more security policies specify one or more of the following: security zone(s), network access right(s), data access right(s), insertion of the security appliance, or removal of the security appliance, the one or more security policies indicate a number of units of data, and the first route bypasses or traverses through the security appliance;
determining one or more flow table entries for configuring one or more flow table(s) of one or more SDN switches, according to the number of units of data indicated by the one or more security policies;
providing the one or more flow table entries to update the one or more flow table(s) of the one or more SDN switches to provide a second route between the first node and the second node, wherein the second route traverses through or bypasses the security appliance, based on the one or more security policies indicating the data flow can bypass or travel through the security appliance; and
transmitting, to one of the one or more SDN switches, Transport Control Protocol (TCP) information for the data flow, wherein the TCP information comprises one or more of the following:
(a) a TCP Sequence number of a client flow;
(b) a TCP Acknowledgment number of the client flow;
(c) a TCP Sequence number of a server flow; or
(d) a TCP Acknowledgment number of the server flow, and an offset is calculated based on the TCP Sequence number, the TCP Acknowledgment number, the TCP Sequence number, or the TCP Acknowledgment number.

14. The method of claim 13, wherein
the first route traverses through the security appliance;
the one or more security policies indicate the data flow can bypass the security appliance; and
the second route bypasses the security appliance.

15. The method of claim 13, wherein
the first route bypasses the security appliance;
the one or more security policies indicate the data flow is to be scanned by the security appliance; and
the second route traverses through the security appliance.

16. The method of claim 13, wherein the security appliance is integrated with the SDN controller.

17. The method of claim 13, further comprising:
calculating the offset based on the TCP information; and
transmitting the offset to the one of the one or more SDN switches.

* * * * *